United States Patent [19]  [11]  4,385,140
Wagner et al.  [45]  May 24, 1983

[54] MODIFIED AZULMIC ACIDS

[75] Inventors: Kuno Wagner, Leverkusen; Kurt Findeisen, Odenthal, both of Fed. Rep. of Germany

[73] Assignee: Bayer Aktiengesellschaft, Leverkusen, Fed. Rep. of Germany

[21] Appl. No.: 11,554

[22] Filed: Feb. 12, 1979

[30] Foreign Application Priority Data

Feb. 14, 1978 [DE] Fed. Rep. of Germany ....... 2806020

[51] Int. Cl.$^3$ ............................................. C08L 75/00
[52] U.S. Cl. ........................................... 524/9; 524/10; 524/14; 524/17; 524/22; 524/27; 524/26; 524/58; 524/72; 524/81; 524/89; 524/100; 524/401; 524/406; 524/414; 524/416; 524/417; 524/702; 524/704; 524/706; 524/720; 524/729; 524/732; 524/735; 524/742; 524/745; 524/789; 525/417; 525/418
[58] Field of Search ................... 524/9, 10, 14, 17, 22, 524/27, 28, 56, 58, 72, 81, 89, 100, 401, 406, 414, 416, 417, 702, 704, 706, 720, 729, 732, 735, 742, 745, 789

[56] References Cited

U.S. PATENT DOCUMENTS 1,464,802  8/1923  Bohart ..................................... 8/76
1,464,803  8/1923  Bohart ..................................... 8/52
2,855,365  10/1958  Barleson ............................. 252/8.5

FOREIGN PATENT DOCUMENTS 949060  8/1956  Fed. Rep. of Germany .

OTHER PUBLICATIONS

Volker, *Angew. Chem.* 72, No. 11, 1960, pp. 379–384.
Hackh's Chemical Dictionary, McGraw-Hill, N.Y., 1944, pp. 92 & 264.
*Encyclopedia of Polymer Science & Technology*, vol. 7, John Wiley & Sons, N.Y., 1967, pp. 568–573.

*Primary Examiner*—Maurice J. Welsh
*Attorney, Agent, or Firm*—Gene Harsh; Joseph C. Gil

[57] ABSTRACT

The present invention relates to new modified azulmic acids, several processes for their preparation and their use as intermediate products for the synthesis of numerous products.

28 Claims, No Drawings

MODIFIED AZULMIC ACIDS

BACKGROUND OF THE INVENTION

Polymeric hydrocyanic acids, so-called azulmic acids, and several processes for their preparation have already been described (compare Houben-Weyl, volume 8 (1952), page 261: German Patent Specification No. 662,338 and German Patent Specification 949,060). Thus, polymeric hydrocyanic acid is obtained, for example, by heating monomeric hydrocyanic acid to the reaction temperature in dilute aqueous solution in the presence of basic catalysts, such as ammonia, sodium cyanide, sodium cyanate, potassium cyanate or alkaline earths, and, after the reaction has started, taking care that a reaction temperature of 120° C. is not exceeded by cooling the mixture (compare German Patent Specification No. 662,338). In a particular variant of this process, further hydrocyanic acid is added to the mixture of solvent-and hydrocyanic acid-catalyst in which the reaction has already started (compare German Patent Specification No. 949,060). These known hydrocyanic acid polymers are brown-black to black pulverulent products which are insoluble in all inert solvents, but which dissolve in 1 N aqueous sodium hydroxide solution, with decomposition even in the cold. A serious disadvantage of hydrocyanic acid polymers of this type is that both when stored under dry conditions and under moist conditions, small amounts of hydrogen cyanide are continuously split off even at room temperature. As the temperature increases, the rate at which hydrogen cyanide is split off also increases. Amounts of hydrocyanic acid which are far above the legally imposed maximum workplace concentration value of hydrocyanic acid of 11 ppm therefore even occur in containers holding azulmic acids, no matter how mild the storage conditions are. Use in practice of the known hydrocyanic acid polymers for the most diverse purposes thus presents an exceptional danger to the environment and is therefore scarcely possible.

According to a proposal by Th. Völker, the brown-black polymeric hydrocyanic acid (azulmic acid) prepared in water has essentially the following formula (compare Angew. Chem. 72, (1960) pages 379-384):

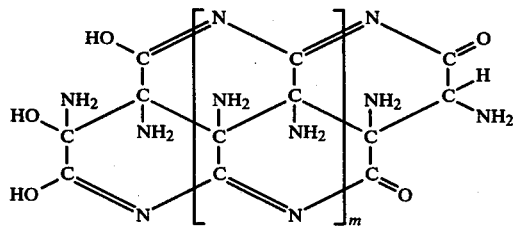

A degree of polymerization (HCN) of X=15-24 has been calculated from the oxygen contents of known azulmic acids, so that values of 1 to 4 result for m (formula I). The maximum molecular weights achieved for the polymers are slightly above 700.

DESCRIPTION OF THE INVENTION

This invention relates to modified azulmic acids containing from 0.5 to 55 percent by weight of ionic groups of the formula

in which R represents hydrogen, ammonium, one equivalent of a protonated or quaternized organic nitrogen base or of a sulphonium cation or one equivalent of a metal cation, and containing from 0.5 to 15 percent by weight of groups formed by decarboxylation reactions, of the formula

and acid addition salts and complex compounds of these modified azulmic acids, and also mixed products of these modified azulmic acids with additives.

The present invention furthermore relates to processes for the preparation of the above modified azulmic acids, acid addition salts and complex compounds thereof and the mixed products of these modified azulmic acids with additives, and processes consisting of procedures in which (1) azulmic acid, which is known and almost free from structural defects, in an aqueous medium, (a) is treated with organic or inorganic acids, optionally in the presence of additives, or (b) is treated with bases or basic salts, optionally in the presence of additives, or (c) is treated with water in neutral range, or (d) is treated with vegetable ashes, catalytically active naturally occurring substances and/or fertilizers, or (e) is treated with metal salts, optionally in the presence of oxidizing agents and optionally in the presence of organic acids, or (f) is treated with metal salt complexes of stabilized azulmic acids, or (g) is treated with oxidizing agents, or in which (2) hydrocyanic acid is polymerized under hydrolyzing conditions in an aqueous medium with the aid of basic catalysts, optionally in the presence of additives, or in which (3) modified azulmic acids are reacted with bases in an aqueous medium and the cation is then optionally replaced by treatment with metal salts, or in which (4) modified azulmic acids are treated with organic or inorganic acids in an aqueous medium, and the products prepared by one of the processes mentioned are then optionally treated with an acid or base.

The invention furthermore relates to the use of the products according to the invention for various purposes. Thus, they are suitable, for example, as intermediate products for the preparation of stabilized azulmic acids, by which there are to be understood azulmic acids with a high resistance towards the splitting off of hydrocyanic acid. The substances according to the invention can also be employed as catalysts and reactive fillers in isocyanate chemistry, for the preparation of polyurethane plastics. Those substances according to the invention which have a high ionic constituent and thus have a polyelectrolyte character can function as ion exchangers. Products according to the invention which contain phosphoric acid, phosphorous acid, polymethyleneureas and/or polymethylenemelamines and other suitable additives can be used as flame-proofing agents, anti-ageing agents and reactive fillers for the most diverse polyurethane plastics, vinyl polymers, polyamide plastics, rubbers and epoxide resins. Moreover, the products according to the invention can either be used themselves as agrochemicals, or can be used as intermediate products for the preparation of agrochemicals.

In the present case, by modified azulmic acids there are to be understood those hydrocyanic acid polymers which contain ionic groups of the formulae

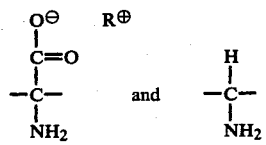

Groups of this type originate from nitrile groups, which are present in azulmic acid and can be regarded as terminal points for the cyclizing nitrile polymerization.

In the ideal case, the transition of a nitrile group of azulmic acid into a corresponding carboxyl group can be illustrated by way of formulae as follows:

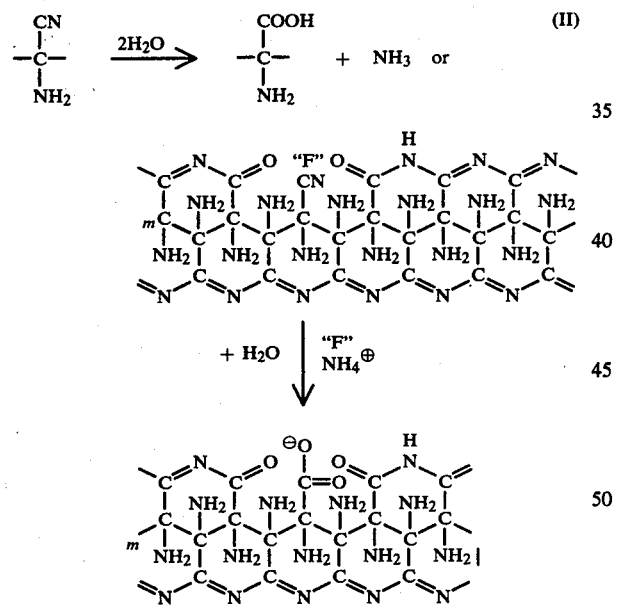

(II)

The formation of amide or imide groups from nitrile groups is, of course, also possible. Thus, for example, the formation of amide groups can be represented by the equation which follows.

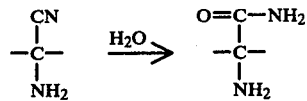

Ionic or non-ionic groups of the above formulae are produced according to the invention not only at the nitrile groups which are already present in the polymer employed, but also at those nitrile groups which are formed by catalytic decyclization reactions. Furthermore, various other hydrolysis reactions are responsible for the formation of structural defects. For example, a

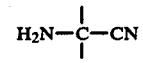

group, which is to be regarded as an α-aminonitrile in the azulmic acid molecular structure, can be converted into a carbonyl group by splitting off hydrogen cyanide and a subsequent topochemical hydrolysis reaction according to the equation which follows:

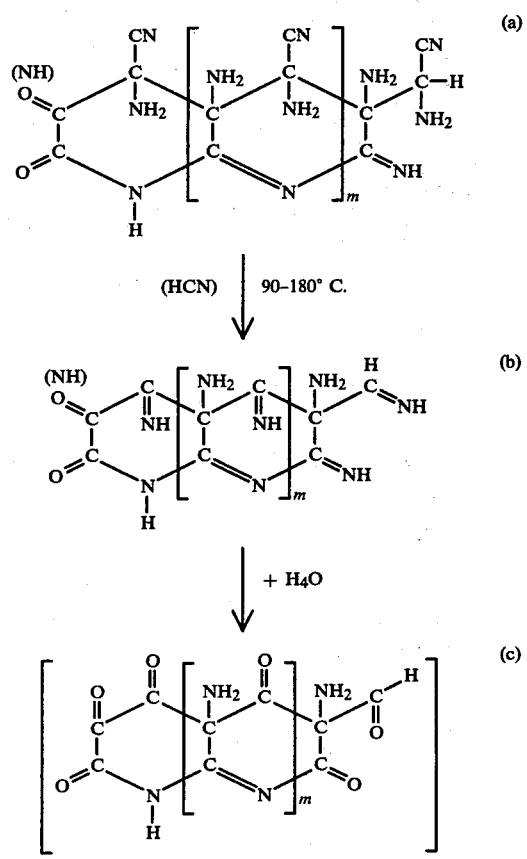

In the text which follows, the ionic groups of the formula

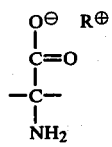

are designated F$_1$ structural defects and the groups of the formula

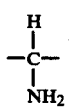

are designated $F_2$ structural defects.

The $F_2$ structural defects are formed from the $F_1$ structural defects, in which R represents hydrogen or another suitable ion, according to the equation which follows:

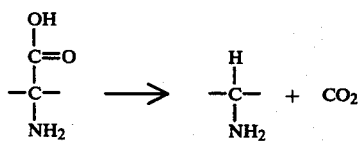

or, in the azulmic acid molecular unit: structural defects by a decarboxylation reaction

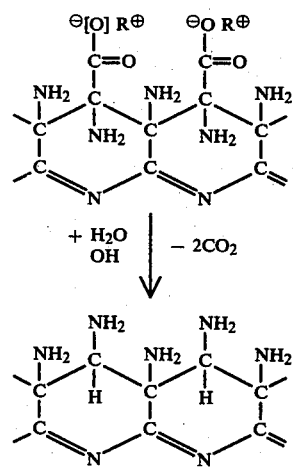

increase in the concentration of $NH_2$ groups, loss in acidity, increase in basicity.

As can be seen from the formula (II) indicated above, each $F_1$ structural defect produced is directly adjacent to an amino group in the α-position and to an amino group in the β-position. Thus, at $F_1$ structural defects of the formula

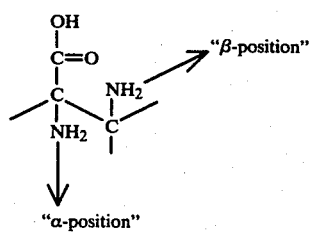

either intramolecular zwitter-ionic salts of the formula

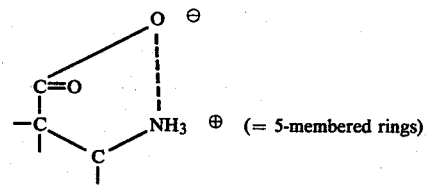

are formed, or intermolecularly crosslinked salts, represented ideally as follows:

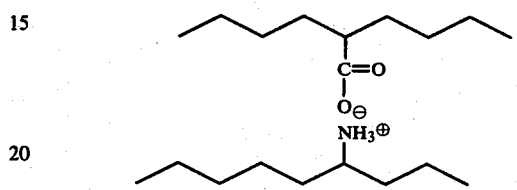

are formed between several azulmic acid molecules. The formation of intramolecular salts, that is to say 5-membered rings, is preferred.

Since the formation of the $F_1$ structural defects is coupled with the liberation of ammonia and the formation of the $F_2$ structural defects is coupled with the liberation of carbon dioxide, the amount of ammonia and carbon dioxide evolved is a quantitative measure of the number of structural defects produced. The quotient of the molar amount of ammonia evolved and the molar amount of carbon dioxide evolved provides information on the ratio of $F_1$ structural defects to $F_2$ structural defects.

In the following text, the content of structural defects, in percent by weight, in the modified azulmic acids according to the invention is in each case determined by relating the equivalent weight of the structural defect concerned (=ionic or non-ionic grouping $F_1$ or $F_2$) to the corresponding weight (100 g) not converted into an ionic or non-ionic grouping. Thus, for example, the concentration of structural defects for an $F_1$ structural defect in which R represents hydrogen is calculated from the particular molar amount of ammonia formed and the fact that the associated ionic grouping of the formula

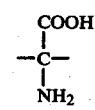

has an equivalent weight of 73.

In an analogous manner, the content of $F_2$ structural defects is calculated from the particular amount of carbon dioxide evolved and the fact that the relevant grouping of the formula

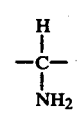

has an equivalent weight of 29.

It is to be regarded as extremely surprising that the modified azulmic acids according to the invention and acid addition salts, complex compounds and mixed products thereof are accessible from the known azulmic acids by a topochemical reaction, although the polymers employed as starting materials are completely insoluble and, because of the low porosity, have only a relatively small surface area. In contrast to the hydrocyanic polymers previously known, the modified azulmic acids according to the invention dissolve very readily in 0.5 to 1 normal aqueous sodium hydroxide solution or potassium hydroxide solution. Furthermore, it is surprising that controlled introduction of structural defects is possible.

The substances according to the invention have a substantially higher swellability than the previously known azulmic acids. They possess reactive groups and can be used in many ways. In particular, they are suitable as starting materials for the preparation of stabilized azulmic acids, by which there are to be understood, in the present case, condensation products of azulmic acids containing structural defects with aldehydes or ketones. The substances according to the invention thus represent a valuable enrichment of the art.

The structural defects contained in the modified azulmic acids according to the invention are defined by the formulae $(F_1)$ and $(F_2)$. In the formula $(F_1)$, R preferably represents hydrogen, ammonium or one equivalent of a cation of a metal from main groups I to V or from sub-groups I to VIII, examples which may be mentioned being the cations of lithium, sodium, potassium, beryllium, magnesium, calcium, strontium, barium, aluminum, thallium, tin, lead, bismuth, copper, silver, gold, zinc, cadmium, mercury titanium, zirconium, chromium, manganese, iron, cobalt, nickel, platinum and palladium, rhodim and rutenium.

R furthermore preferably represents one equivalent of a protonated alkylamine with 1 to 6 carbon atoms, a protonated dialkylamine with 1 to 6 carbon atoms per alkyl group, a protonated trialkylamine with 1 to 6 carbon atoms per alkyl group, a protonated hydroxyalkylamine with 1 to 6 carbon atoms, a protonated di-(hydroxy-alkyl)-amine with 1 to 6 carbon atoms per hydroxyalkyl group, a protonated tri-(hydroxyalkyl)-amine with 1 to 6 carbon atoms per hydroxyalkyl group, a protonated cycloalkylamine with 3 to 8 carbon atoms, a protonated alkylenediamine with 2 to 6 carbon atoms, a protonated guanidine, melamine or dicyandiamide or of a protonated, saturated or unsaturated heterocyclic nitrogen base with 5 to 7 ring members and 1 to 3 nitrogen atoms in the heterocyclic ring, and also represents those cations which are formed by quaternization, such as, for example, permethylation, of the above-mentioned basic nitrogen compounds. Particularly preferred nitrogen bases in this context are methylamine, dimethylamine, trimethylamine, ethylamine, diethylamine, triethylamine, tert.-butylamine, ethanolamine, diethanolamine, triethanolamine, cyclopropylamine, cyclopentylamine, cyclohexylamine, ethylenediamine, pyrrolidine, piperidine, morpholine, imidazole, pyrazole, 1,2,4-triazole, 1,2,3-triazole, 2-ethylimidazole and aminotriazole. R also preferably represents trialkylsulphonium cations, in particular the triethylsulphonium cation.

By acid addition salts, according to the invention, of azulmic acid there are to be understood those salts which are formed by addition of a proton of an inorganic or organic acid onto an amino group or another suitable group in a modified azulmic acid. Preferred possible inorganic acids here are hydrogen halide acids, such as hydrofluoric acid, hydrochloric acid and hydrobromic acid, and furthermore phosphorus acids, such as phosphoric acid, phosphorous acid, dialkylphosphoric acid, for example dibutylphosphoric acid, polyphosphoric acid with molecular weights from 6,000 to 40,000 and phospholine oxide-phosphonic acids, for example those of the formulae

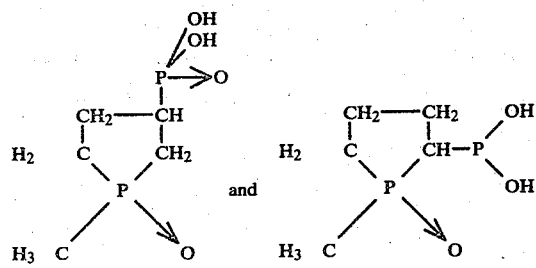

and furthermore nitric acid and acids derived from sulphur, such as sulphuric acid and sulphonic acids, examples which may be mentioned being ethylsulphonic acid, p-toluenesulphonic acid and naphthalene-1,5-disulphonic acid. Preferred possible organic acids are saturated or unsaturated carboxylic acids, such as formic acid, acetic acid, propionic acid, 2-ethylcaproic acid, acrylic acid, methacrylic acid, oleic acid and ricinoleic acid, and furthermore halogeno-carboxylic acids, such as chloroacetic acid, dichloroacetic acid and trichloroacetic acid, and also dicarboxylic acids, such as maleic acid, fumaric acid and succinic acid, and half-esters derived therefrom, and in addition hydroxycarboxylic acids, such as hydroxyacetic acid, tartaric acid, citric acid and salicylic acid.

By azulmic acid complex compounds according to the invention there are to be understood, preferably, complexes of modified azulmic acids and metal compounds or ammonium salts. Possible metal compounds here are, in particular, salts, acids, hydroxides and oxides of metals of main groups II to V or of sub-groups I to VIII. Examples which may be mentioned are calcium chloride, acetate, nitrate, hydroxide and oxide, strontium nitrate, barium chloride and acetate, borates, aluminum acetate and formate, thallium sulphate, thallium nitrate, silicon tetrachloride, sodium and potassium silicate, tin-II chloride, lead-II chloride, acetate and hydroxide, bismuth-III hydroxide and bismuth-III nitrate, copper sulphate, nitrate and acetate, silver nitrate, aurichlorohydric acid, zinc chloride and acetate, cadmium chloride, mercury-II chloride, titanium tetrachloride and tetrabutylate, zirconium sulphate, vanadates, chromium-III chloride, molybdates, tungstates and heteropolyacids thereof, manganese-II sulphate and acetate, iron-II sulphate and acetate and iron-III chloride, cobalt chloride, nickel chloride, hexachloroplatinic acid and palladium-II chloride. Possible ammonium salts are, in particular, ammonium nitrate and ammonium acetate.

Additives which the products according to the invention can contain are naturally occurring organic substances and products obtained therefrom, naturally occurring inorganic substances and products obtained therefrom, synthetic organic products, synthetic inorganic products and/or mixed products consisting of organic and inorganic products.

Preferred possible naturally occurring organic substances and products obtained therefrom are, in this case, wood flour, lignin powder, lignin-sulphonic acids, ammonified lignin-sulphonic acids, humus, humic acids, ammonified humic acids, peat, proteins and degradation products, for example hydrolysis products, of yeasts, algal material (alginates), polypeptides, such as wool and gelatin, fish-meal and bone-meal, and furthermore aminoacids, oligopolypeptides, pectins, monosaccharides, such as glucose and fructose, disaccharides, such as sucrose, aligosaccharides, polysaccharides, such as starch and cellulose, and also hemicelluloses, homogenized materials of vegetable and animal origin, active charcoals and ashes which are obtainable by partial oxidation, complete oxidation or combustion of organic substances formed by photosynthesis or of customary fuels, fir ash, broom ash, ash of Serbian spruce, oak ash, birch ash, beech ash, willow ash and tobacco leaf ash being mentioned in particular.

Preferred possible naturally occurring inorganic substances and products obtained therefrom are silicates, such as aluminum silicates, calcium silicates, magnesium silicates and alkali metal silicates, furthermore sea sand and other naturally occurring silicon dioxides, silicic acids, in particular disperse silicic acids, silica gels, and also clay minerals, mica, carbonates, such as calcium carbonate, phosphorite and phosphates, such as calcium phosphate and ammonium magnesium phosphate, sulphates, such as calcium sulphate and barium sulphate, and in addition oxides, such as zirconium dioxide, nickel oxide, palladium oxide, barium oxide, disperse antimony oxides and aluminum oxides, such as bauxite and hydrated aluminum oxide, and further fly ashes and the most diverse types of carbon black.

Preferred possible synthetic organic products are aminoplast condensates, in particular those of urea, dicyandiamide, melamine or oxamide and aldehydes, such as formaldehyde, acetaldehyde, isobutyraldehyde, hydroxypivalaldehyde, crotonaldehyde, hydroxyacetaldehyde, furfuryl, hydroxymethylfurfurol, glyoxal and glucose, particular products which may be mentioned being condensation products of urea and formaldehyde, urea and glyoxal, urea and acetaldehyde, urea and isobutyraldehyde, urea and crotonaldehyde, urea and hydroxypivalaldehyde and 2-oxo-4-methyl-6-ureido-hexahydropyrimidine, which is a known condensation product of 1 mol of crotonaldehyde and 2 mols of urea and is formed from the intermediate product crotonylidene-diurea by saturation of the double bond and has the formula.

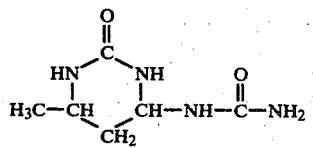

Further preferred possible synthetic organic products are plastics, such as polyamide powders, polyurethane powders and polycarbodiimides, and furthermore polymeric quinones, addition products and condensation products of quinones, in particular benzoquinone, with amines or ammonia, and also with aldehydes, in particular formaldehyde, crosslinked gelatin, synthetic agents for improving soil, such as, for example, the product known as Hygromull (=urea/formaldehyde resin flakes), furthermore synthetic sugars, such as, for example, formose sugar mixtures prepared from formaldehyde, and also sparingly soluble cane sugar complexes, such as the sucrose-calcium oxide complex having the composition 1 mol of sucrose.3 mols of calcium oxide, and finally organic ammonium salts, such as ammonium carbaminate, and other organic nitrogen compounds, such as hexamethylenetetramine and hexahydrotriazines.

Preferred possible synthetic inorganic products which may be mentioned are fertilizers, such as superphosphate, basic slag, Rhenania phosphate, phosphorite, calcium cyanamide, calcium ammonium nitrate, Leuna saltpeter, potassium phosphates, potassium nitrate and ammonium nitrate, and furthermore pigments, such as iron oxides and titanium dioxides, and also metal oxides and metal hydroxides, such as calcium oxide, calcium hydroxide, lead hydroxide, bismuth hydroxide, manganese hydroxide and magnesium hydroxide, hydroxides which are prepared in situ being particularly preferred, and furthermore synthetic silicic acids, in particular silicic acid prepared in situ, and salts thereof, and also waterglass, salts such as cobalt molybdate, ammonium carbonate and calcium carbonate, and in addition catalysts, in particular heavy metal catalysts, of the most diverse nature.

Preferred possible mixed products consisting of inorganic and organic products are neutral, basic or acid soils, naturally occurring agents for improving soil, biologically active garden mold and sewage sludges.

The additives can be physically and/or chemically bonded to the products according to the invention in an amount of from 1 to 95 percent by weight, preferably from 5 to 90 percent by weight. In some cases they can be products in which the modified azulmic acids are coated by the additives. Modified azulmic acids coated, for example micro-encapsulated, by polycarbodiimides may be mentioned as an example of products of this type.

Hydrocyanic acid polymers which are almost free from structural defects, so-called azulmic acids, are used as starting materials in the preparation of the products according to the invention by process (1), variants (a) to (g), according to the invention. Azulmic acids of this type which are almost free from structural defects are already known (compare Houben-Weyl, volume 8 (1952), page 261; German Patent Specification No. 662,338 and German Patent Specification No. 949,060.

In variant (a) of process (1), according to the invention, the azulmic acids which are almost free from structural defects are treated with inorganic or organic acids, optionally in the presence of additives. Preferred possible inorganic or organic acids for this treatment are preferably all those acids which have already been listed as preferred in connection with the description of the acid addition products, according to the invention, of azulmic acid. Additives which can be used are naturally occurring organic substances and products obtained therefrom, naturally occurring inorganic substances and products obtained therefrom, synthetic organic products, synthetic inorganic products and/or mixed products consisting of organic and inorganic products. These include, preferably, all those materials which have already been mentioned as preferred in connection with the description of the additives optionally present in the substances according to the invention.

Variant (a) of process (1) according to the invention is carried out in an aqueous medium, preferably in water. However, it is also possible to replace some of the water by other diluents, such as hydrogen sulphide or alcohols, methanol and ethanol being mentioned in particular.

In the case of variant (a) of process (1) according to the invention, the reaction temperatures can be varied within a substantial range. In general, the reaction is carried out between 0° C. and 200° C., preferably between 20° C. and 120° C.

In general, the reaction in variant (a) of process (1) according to the invention is carried out under normal pressure. However, it is also possible to carry out the reaction under increased pressure.

In carrying out variant (a) of process (1) according to the invention, a catalytic amount or 1 to 4 mols of an inorganic or organic acid and optionally an amount of additives such that the proportion thereof in the end product is between 1 and 95 percent by weight, preferably between 5 and 90 percent by weight, are employed per 1 mol (relative to the molecular unit

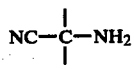

with the equivalent weight 54) of azulmic acid which is almost free from structural defects. The mixture is worked up by customary methods. In general, a procedure is followed in which, after the reaction has ended, the reaction mixture is filtered and the solid product obtained is appropriately washed and dried.

If nitric acid is used for producing substance defects in carrying out variant (a) of process (1) according to the invention, and the reaction temperature is thereby kept relatively low, preferably between 20° and 30° C., traces of hydrocyanic acid split off are oxidized, while at the same time addition reactions of nitric acid with the amino groups of the modified azulmic acids take place extremely readily, and type of modified azulmic acids which contain ionic groups of the formula

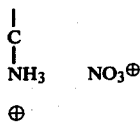

on their amino groups are obtained by a simple topochemical reaction.

In this manner, about 0.5 mol of nitric acid is bonded per 100 parts of weight of modified azulmic acid. Depending on the type of process and the reaction time of the dilute nitric acid on the modified azulmic acids, about 30 to 50% of the amino groups present are available for salt formation. Traces of free nitric acid can advantageously be converted into ammonium nitrate by gassing the products with gaseous ammonia, the reaction advantageously being carried out in the solid phase in a fluidized bed.

If phosphoric acid or phosphorous acid is used for producing structural defects in carrying out variant (a) of process (1) according to the invention, and the reaction temperatures are thereby kept relatively low, preferably between 20° C. and 55° C., decarboxylation reactions and the production, associated therewith, of $F_2$ structural defects are largely suppressed. At the same time, the acids are bonded extremely readily by the amino groups of the modified azulmic acids in a heterogeneous reaction. In this manner, about 0.2 mol of phosphoric acid, or about 0.5 mol of phosphorous acid, are already bonded by 100 parts of weight of modified azulmic acid within five minutes. The salts formed are almost water-insoluble. Small amounts of free phosphoric acid or phosphorous acid contained in the products can advantageously be converted into the corresponding ammonium salts by treating the products with gaseous ammonia, the reaction advantageously being carried out in the solid phase in a fluidized bed.

In a particular embodiment of variant (a) of process (1) according to the invention, the azulmic acid is reacted with 0.2 to 80% strength phosphoric acid or phosphorous acid in the presence of naturally occurring hydrolytically degradable substances, such as, for example, celluloses, hemicelluloses, sugars, lignin, polymeric quinones, wood powder, vegetable material, polypeptides, such as gelatins and wool, and furthermore yeast proteins, algal compositions and peat plants. In this embodiment, the structural defects are produced with simultaneous hydrolytic degradation of the particular naturally occurring substances employed. If polypeptides are used, these are split into aminoacid mixtures. Because of its numerous amino groups, the azulmic acid bonds about 0.3 to 0.4 mol of phosphoric acid or phosphorous acid, while the phosphoric acid salts of the aminoacids or those of the oligopolypeptides, or the other low-molecular degradation products of the naturally occurring substances employed are frequently fixed by the azulmic acid matrix in a large amount, even when they are water-soluble. Excess acid, for example phosphoric acid, can be precipitated as calcium phosphate on the azulmic acid matrix by adding calcium hydroxide. If hydrolyzed sugars and oligosaccharides are present in this case, they are absorbed on the azulmic acid in the form of their calcium complexes, which are usually sparingly soluble. The process products obtained by this variant of process (1) according to the invention can be stored for a relatively long period without unpleasant odors being formed, as is otherwise the case when naturally occurring substances such as oligopeptides, peptide/sugar mixtures and the like are degraded by biological processes.

A further particular embodiment of variant (a) of process (1) according to the invention consists of a procedure in which, in order to produce the structural defects, 1 to 4 mols of 1 molar phosphoric acid solution are employed and the excess phosphoric acid is then precipitated as calcium phosphate by adding calcium chloride, as magnesium phosphate by adding magnesium chloride or as ammonium magnesium phosphate by adding ammonium and magnesium salts. Additives of the most diverse nature can also be used at the same time during this procedure. Particularly preferred additives in this case are vegetable ashes, insoluble polyquinones, addition products or condensation products of benzoquinone and amines, in particular ammonia, and furthermore lignin, lignin-sulphonic acid, humic acids, diverse fly ashes, bauxite, aluminum oxide, cobalt molybdate, silicon dioxide, active charcoal, zirconium dioxide, nickel oxide, palladium oxide and barium oxide. Further preferred possible additives are also sugars, such as cane sugar and other sugars containing no free aldehyde groups, or formose sugar mixtures prepared from formaldehyde. These very diverse types of sugars can be fixed in the channels and pores of the solid azulmic acid matrix. Furthermore, the various sugars can also be absorbed onto the azulmic acids in the form of their calcium complexes, which are usually sparingly soluble.

In variant (b) of process (1) according to the invention, the azulmic acids which are almost free from structural defects are treated with bases or basic salts, optionally in the presence of additives. Both organic and inorganic bases can be used as the bases here. Organic bases which can preferably be used are ammonia, alkylamines with 1 to 6 carbon atoms, dialkylamines with 1 to 6 carbon atoms per alkyl group, hydroxyalkylamines with 1 to 6 carbon atoms, di-(hydroxyalkyl)-amines with 1 to 6 carbon atoms per hydroxyalkyl group, tri-(hydroxyalkyl)-amines with 1 to 6 carbon atoms per hydroxyalkyl group and alkyl-hydroxyalkyl-amines with 1 to 6 carbon atoms in the alkyl group and in the hydroxyalkyl group. Cycloalkylamines with 3 to 8 carbon atoms, alkylenediamines with 2 to 6 carbon atoms, guanidine, melamine, dicyandiamide, saturated or unsaturated heterocyclic nitrogen bases with 5 to 7 ring members and 1 to 3 nitrogen atoms in the heterocyclic ring, and those bases which are derived from the compounds formed by quaternization, for example permethylation, of the above-mentioned nitrogen compounds, and furthermore those bases which are derived from trialkylsulphonium compounds. Particularly preferred nitrogen bases in this context are ammonia, methylamine, methylethanolamine, dimethylamine, trimethylamine, ethylamine, diethylamine, triethylamine, tert.-butylamine, ethanolamine, diethanolamine, triethanolamine, cyclopropylamine, cyclopentylamine, cyclohexylamine, ethylenediamine, pyrrolidine, piperidine, morpholine, imidazole, aminotriazole and triethylsulphonium hydroxide.

Inorganic bases which can preferably be used are alkali metal hydroxides and alkaline earth metal hydroxides. Lithium hydroxide, sodium hydroxide, potassium hydroxide, magnesium hydroxide, calcium hydroxide, strontium hydroxide and barium hydroxide may be mentioned in particular.

Basic salts which are used for carrying out variant (b) of process (1) according to the invention are, preferably, alkali metal sulphides, such as sodium sulphide, sodium bisulphide and potassium bisulphide, and further sodium thiosulphate, ammonium thiosulphate, ammonium polysulphides, calcium bisulphide, calcium thiosulphate and calcium cyanamide, and also potassium carbonate, potassium bicarbonate, potassium cyanate and water glass (sodium waterglass or potassium waterglass). Mixtures of ammonia and sodium thiosulphate, ammonium thiosulphate, sodium bisulphide, sodium sulphide and/or ammonium polysulphides are also particularly suitable for producing structural defects by this method.

Additives which can be used in carrying out variant (b) of process (1) according to the invention are naturally occurring organic substances and products obtained therefrom, naturally occurring inorganic substances and products obtained therefrom, synthetic organic products, synthetic inorganic products and/or mixed products consisting of organic and inorganic products. These additives include, preferably, all those materials which have already been mentioned as preferred in connection with the description of additives optionally present in the substances according to the invention.

Variant (b) of process (1) according to the invention is carried out in an aqueous medium or in an aqueous-alcoholic medium. A preferred possible reaction medium is water, or a mixture of water and an alcohol, such as methanol or ethanol. However, it is also possible to replace some of the water by hydrogen sulphide. If the reaction is carried out in the presence of hydrogen sulphide or in the presence of reagents which release hydrogen sulphide under the reaction conditions and the reaction temperature is kept between 70° C. and 100° C., small amounts of hydrocyanic acid split off are converted into carbon oxysulphide and ammonia, structural defects simultaneously being produced.

The reaction temperatures can be varied within a substantial range in the case of variant (b) of process (1) according to the invention. In general, the reaction is carried out at temperatures between 0° C. and 200° C., preferably between 20° C. and 150° C.

In general, the reaction in variant (b) of process (1) according to the invention is carried out under normal pressure. However, it is also possible to carry out the reaction under increased pressure. The latter is particularly advisable if gaseous ammonia is used for producing structural defects.

In carrying out variant (b) of process (1) according to the invention, a catalytic amount, or 1 to 4 mols, preferably 1 to 2 mols, of base or basic salt and optionally an amount of additives such that their proportion in the end product is between 1 and 95 percent by weight, preferably between 5 and 90 percent by weight, are employed per 1 mol (relative to the molecular unit

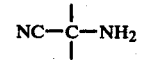

with the equivalent weight 54) of azulmic acid which is almost free from structural defects. The mixture is worked up by customary methods. In general, a procedure is followed in which, after the reaction has ended, the reaction mixture is filtered and the solid product obtained is appropriately washed and dried. The base still contained in the end product can also advantageously be neutralized by adding a corresponding amount of acid, such as, for example, phosphoric acid, so that the products formed then also contain the particular salts.

If an excess of acid is used in the neutralization, acid addition salts of the particular modified azulmic acids are formed.

If strong bases are used for producing structural defects in carrying out variant (b) of process (1) according to the invention, azulmic acids with particularly high contents of structural defects can be prepared after relatively long reaction times. The products formed have a polyelectrolyte character. In the case where potassium hydroxide is employed as the base, the course of a reaction of this type can be illustrated ideally by the equation which follows:

"F"

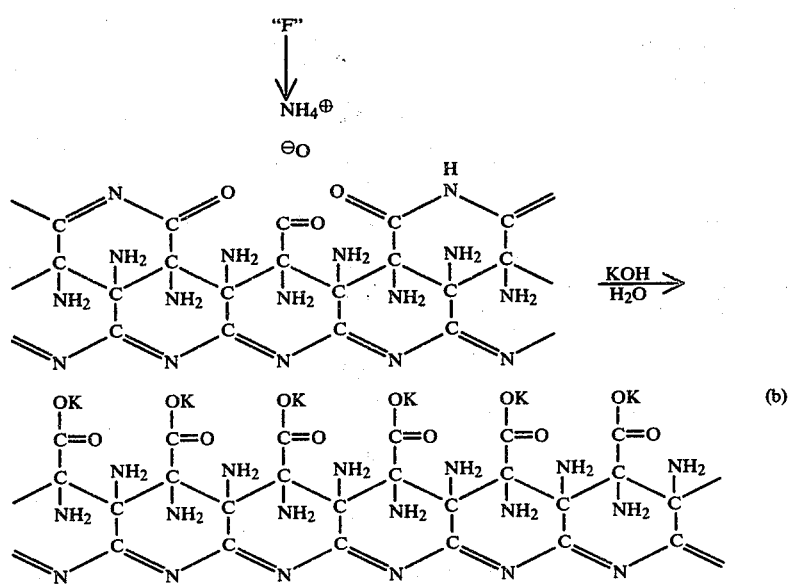

(b)

If an excess of concentrated (25% strength) ammonia solution is used in this variant (b) of process (1) according to the invention, and the reaction is carried out at room temperature, after a reaction time of about 6 to 20 hours, modified azulmic acids which contain a high proportion of structural defects and in which some of the carboxyl groups are present in the form of ammonium carboxylate groups are obtained. However, it is also possible to convert modified azulmic acids in which free carboxyl groups are present into the corresponding products containing the ammonium salt by gassing with ammonia in a fluidized bed.

In a particular embodiment of variant (b) of process (1) according to the invention, the azulmic acid is reacted with gaseous ammonia under pressure in an aqueous-alcoholic medium at temperatures between 120° C. and 140° C. Modified azulmic acids which have a high content of ammonium carboxylate groups are formed in this procedure. The free amino groups contained in these products are capable of additionally also bonding acids, such as, for example, phosphoric acid, so that the end products contain ammonium ions and acid radicals side by side.

In a further particular embodiment of variant (b) of process (1) according to the invention, the azulmic acid is reacted with catalytic amounts, or even with larger amounts, of waterglass—about 1 to 4 mols of waterglass per 100 g of azulmic acid—in a topochemical reaction. In this procedure, modified azulmic acids charged with potassium ions or sodium ions are formed, the saponifiable nitrile groups of which act as latent acids and precipitate silicic acids. The latter are absorbed, in fine distribution, onto the reaction products. Any excess sodium silicate or potassium silicate present can be precipitated by simple gassing of the particular dispersions with carbon dioxide, or can be precipitated in a particularly advantageous manner by adding phosphoric acid or calcium chloride mixed with potassium phosphates or sodium phosphates or calcium silicates.

In variant (c) of process (1) according to the invention, the azulmic acids which are almost free from structural defects are treated with distilled water in the neutral range, preferably at pH values between 6 and 6.5, for 4 to 60 hours. The reaction temperatures can be varied within a substantial range in this procedure. In general, the reaction is carried out at temperatures between 60° C. and 150° C., preferably between 80° C. and 120° C. In general, the reaction is carried out under normal pressure. However, it is also possible to carry it out under increased pressure. Isolation of the reaction products is also carried out by customary methods in this variant of the process according to the invention. In general, a procedure is followed in which, after the reaction has ended, the reaction mixture is filtered and the solid product obtained is dried.

In variant (d) of process (1) according to the invention, the azulmic acids which are almost free from structural defects are treated with vegetable ashes, catalytically active naturally occurring substances and/or fertilizers.

Possible vegetable ashes in this procedure are the combustion products of the most diverse substances formed by photosynthesis. Preferred ashes which may be mentioned are the ashes of fir, broom, Serbian spruce, oak, straw, birch, beech, willow, tobacco leaves and tobacco stalks, and furthermore of cereals, such as rye or barley, and also of fungi, for example edible mushrooms, and of apples, carrots, potato tubers and leaves of white cabbage. It is particularly advantageous to use potassium-rich varieties of ash. By ashes there are also to be understood here mixtures of various vegetable ashes.

Preferred possible catalytically active naturally occurring substances are biologically active garden mold and basic or acid soils of the most diverse nature.

All the commercially available fertilizers can be used as fertilizers for the production of structural defects in variant (d) of process (1) according to the invention. Preferred fertilizers which may be mentioned are varieties of peat charged with plant nutrients, superphosphate, basic slag, Rhenania phosphate, phosphorite, calcium cyanamide, calcium ammonium nitrate, Leuna saltpeter, potassium phosphates, potassium nitrate and ammonium nitrate.

Variant (d) of process (1) according to the invention is carried out in an aqueous medium, preferably in water. However, it is also possible to replace some of the water by other diluents, such as hydrogen sulphide or alcohols, methanol or ethanol being mentioned in particular.

The reaction temperatures can be varied within a substantial range in the case of variant (d) of process (1) according to the invention. In general, the reaction is carried out between 50° C. and 150° C., preferably between 80° C. and 120° C.

In general, the reactions in variant (d) of process (1) according to the invention are carried out under normal pressure. However, it is also possible to carry out the reactions under increased pressure.

In carrying out variant (d) of process (1) according to the invention, the azulmic acid is reacted with catalytic, or even with larger amounts, of vegetable ashes, catalytically active naturally occurring substances and/or fertilizers. If the vegetable ashes, catalytically active naturally occurring substances and/or fertilizers are used in a relatively large amount, these substances are not only used for producing structural defects, but they are also simultaneously contained, as additives, in the products formed. The mixture is worked up by customary methods. In general, a procedure is followed in which, after the reaction has ended, the reaction mixture is filtered and the solid product obtained is appropriately washed and dried.

In variant (e) of process (1) according to the invention, the azulmic acids which are almost free from structural defects are treated with metal compounds, optionally in the presence of oxidizing agents and optionally in the presence of organic acids.

Preferred possible metal compounds here are salts of metals of main groups II to V or of sub-groups I to VIII. Examples which may be mentioned are calcium chloride, acetate and nitrate, strontium nitrate, barium chloride and acetate, aluminum acetate and formate, thallium sulphate and nitrate, silicon tetrachloride, sodium silicate and potassium silicate, tin-II chloride, lead-II chloride, acetate and nitrate, bismuth-III nitrate, copper sulphate, nitrate and acetate, silver nitrate, aurichlorohydric acid, zinc chloride and acetate, cadmium chloride, mercury-II chloride, titanium tetrachloride and tetrabutylate, zirconium sulphate, chromium-III chloride, manganese-II sulphate and acetate, iron-II sulphate and acetate and iron-III chloride, cobalt chloride, nickel chloride, hexachloroplatinic acid and palladium-II chloride. Further metal compounds which can preferably be used are the acids of vanadium, molybdenum and tungsten, and hetero-polyacids thereof.

Possible oxidizing agents which can be present in carrying out variant (e) of process (1) according to the invention are all the customary agents which release oxygen. Air, nitric acid, hypochlorous acid, perchloric acid, calcium hypochlorite and hydrogen peroxide can preferably be used.

Preferred possible organic acids which can be present in carrying out varient (e) of process (1) according to the invention are saturated and unsaturated optionally substituted carboxylic acids. Formic acids, acetic acid, propionic acid, 2-ethyl-caproic acid, acrylic acid, methacrylic acid, oleic acid, ricinoleic acid, chloroacetic acid, dichloroacetic acid, trichloroacetic acid and hydroxyacetic acid may be mentioned in particular.

In general, variant (e) of process (1) according to the invention is carried out in an aqueous medium, preferably in water. However, it is also possible to replace some of the water by other diluents, such as acids or organic hydrocarbons, formic acid and xylene being mentioned in particular.

The reaction temperatures can be varied within a substantial range in the case of variant (e) of process (1) according to the invention. In general, the reaction is carried out between 0° C. and 150° C., preferably between 20° C. and 120° C.

In general, the reaction in variant (e) of process (1) according to the invention is carried out under normal pressure. However, it is also possible to carry out the reaction under increased pressure.

In carrying out variant (e) of process (1) according to the invention, a catalytic amount, or even a larger amount—about 1 to 2 mols—of metal compound and optionally a catalytic amount, or even a larger amount of oxidizing agent and optionally a catalytic amount, or even a larger amount, of organic acid are employed per 1 mol (relative to the molecular unit

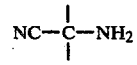

with the equivalent weight 54) of azulmic acid. The mixture is worked up by customary methods. In general, a procedure is followed in which, after the reaction has ended, the reaction mixture is filtered and the solid product thereby obtained is appropriately washed and dried.

Any excess metal compounds present in the products according to the invention can be precipitated in the form of finely divided precipitates, which are frequently sparingly soluble, by adding bases, such as ammonia, sodium hydride or potassium hydroxide, or by adding acids, such as phosphoric acid, depending on the metal compound.

In variant (f) of process (1) according to the invention, the azulmic acids which are almost free from structural defects are treated with metal salt complexes of stabilized azulmic acids.

By stabilized azulmic acids there are to be understood here those products which are formed by reacting azulmic acids containing structural defects with aldehydes, preferably formaldehyde, in an aqueous medium at temperatures between 20° C. and 150° C. and which are very stable towards the splitting off of hydrogen cyanide, both at room temperature and at elevated temperature. If metal salts are allowed to act on such azulmic acids stabilized with aldehydes, the metal salt complexes, of stabilized azulmic acids, which are required as starting materials for carrying out variant (f) of process (1) according to the invention are formed. Metal salt complexes which can preferably be used are those which are derived from those metal compounds which have already been mentioned as preferred in connection with variant (e) of process (1) according to the invention.

Variant (f) of process (1) according to the invention is carried out in an aqueous medium, preferably in water. However, it is also possible to replace some of the water by other diluents, such as alcohols.

The reaction temperatures can be varied within a substantial range in the case of variant (f) of process (1) according to the invention. In general, the reaction is carried out between 0° C. and 150° C., preferably between 20° C. and 120° C.

In general, the reaction in variant (f) of process (1) according to the invention is carried out under normal pressure. However, it is also possible to carry out the reaction under increased pressure.

In carrying out variant (f) of process (1) according to the invention, 0.5 to 1 mol of metal salt complex of stabilized azulmic acid is preferably employed per 1 mol (relative to the molecular unit

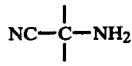

with the equivalent weight 54) of azulmic acid which is almost free from structural defects. The mixture is worked up by customary methods. In general, a procedure is followed in which, after the reaction has ended, the reaction mixture is filtered and the solid product thus obtained is appropriately washed and dried.

Any excess metal compounds present in the products which can be prepared by variant (f) of process (1) according to the invention can be precipitated in the form of finely divided precipitates, which are frequently sparingly soluble, by adding bases, such as ammonia, sodium hydroxide or potassium hydroxide, or by adding acids, such as phosphoric acid, depending on the metal compound.

In variant (g) of process (1) according to the invention, the azulmic acids which are almost free from structural defects are treated with oxidizing agents. Possible oxidizing agents here are all the customary reagents having an oxidizing action. Air, oxygen, potassium permanganate, hydrogen peroxide, chromic acid and bleaching powder can preferably be used.

Variant (g) of process (1) according to the invention is carried out in an aqueous medium, preferably in water. However, it is also possible to replace some of the water by other diluents, such as organic carboxylic acids, formic acid and acetic acid being mentioned in particular.

The reaction temperatures can be varied within a substantial range in the case of variant (g) of process (1) according to the invention. In general, the reaction is carried out between 0° C. and 150° C., preferably between 20° C. and 120° C.

In general, the reaction in variant (g) of process (1) according to the invention is carried out under normal pressure. However, it is also possible to carry out the reaction under increased pressure.

In carrying out variant (g) of process (1) according to the invention, a catalytic amount, or even a larger, optionally equimolar, amount, of oxidizing agent is employed per 1 mol (relative to the molecular unit

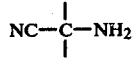

with the equivalent weight 54) of azulmic acid which is almost free from structural defects. The mixture is worked up by customary methods. In general, a procedure is followed in which, after the reaction has ended, the reaction mixture is filtered and the solid product obtained is appropriately washed and dried.

In process (2) according to the invention, monomeric aqueous hydrocyanic acid is polymerized under hydrolyzing conditions with the aid of basic catalysts, optionally in the presence of additives. Dilute aqueous hydrocyanic acid solutions are used as starting materials in this procedure. In general, solutions with a hydrocyanic acid concentration of between 10 and 30%, preferably between 15 and 25% are used.

Possible basic catalysts for process (2) according to the invention are organic and inorganic bases and basic salts of the most diverse nature. Alkali metal cyanides and alkali metal cyanates, such as sodium cyanide, potassium cyanide, sodium cyanate and potassium cyanate, and furthermore amines and ammonia, can preferably be used. Mixtures of the most diverse bases or basic salts can also advantageously be employed; a mixture of sodium cyanate and aqueous ammonia solution may be mentioned as an example.

Naturally occurring organic substances and products obtained therefrom, naturally occurring inorganic substances and products obtained therefrom, synthetic organic products, synthetic inorganic products and/or mixed products consisting of organic and inorganic products can be used as additives in carrying out process (2) according to the invention. These include, preferably, all those materials which have already been mentioned as preferred in connection with the description of the additives optionally present in the substances according to the invention.

Process (2) according to the invention is carried out in an aqueous medium, preferably in water. However, it is also possible to replace some of the water by other diluents, such as hydrogen sulphide or alcohols, methanol and ethanol being mentioned in particular.

The reaction temperatures can be varied within a particular range in the case of process (2) according to the invention, it being necessary, however, for the temperature setting to be adjusted according to the particular reaction phase. In general, the procedure is to first carry out the polymerization at temperatures between 30° C. and 70° C., preferably between 40° C. and 60° C., for 1 to 4 hours so that an approximately 60% conversion of the monomeric hydrocyanic acid is achieved. Thereafter, the polymerization is carried out at temperatures between 70° C. and 95° C., preferably between 80° C. and 90° C., for a further 4 to 10 hours, whereupon a conversion of about 90 to 95% is achieved. The mixture can then be heated to temperatures of about 100° C. for several hours in order to bring the reaction to completion and to remove hydrocyanic acid still present and any volatile amines or ammonia present.

In general, the reaction in process (2) according to the invention is carried out under normal pressure. However, it is also possible to carry out the reaction under increased pressure at temperatures between 120° C. and 150° C. In this procedure, relatively large amounts of structural defects can be produced in the process products in a controlled manner.

In carrying out process (2) according to the invention, the basic catalyst is employed in an amount such that its proportion is 1 to 15%, preferably 2 to 10%, of the monomeric hydrocyanic acid employed.

The additives are optionally added to the reaction mixture in an amount such that their proportion in the end product is between 1 and 95 percent by weight, preferably between 5 and 90 percent by weight. The mixture is worked up by customary methods. In general, a procedure is followed in which, after removing excess hydrocyanic acid and any volatile amines or ammonia present, the reaction mixture is filtered and the solid product thereby obtained is appropriately washed and dried.

In process (3) according to the invention, modified azulmic acids are first reacted with bases or basic salts and the products are then optionally treated with metal salts in a second stage. By modified azulmic acids there are to be understood here azulmic acids which contain structural defects and have been prepared by one of the above-mentioned processes.

Possible bases or basic salts in carrying out process (2) according to the invention are the most diverse inorganic or organic bases and basic salts. Alkali metal hydroxides, such as lithium hydroxide, sodium hydroxide and potassium hydroxide, alkali metal carbonates, such as sodium carbonate, potassium carbonate and potassium bicarbonate, alkali metal sulphides, such as sodium sulphide, potassium sulphide and potassium bisulphide, alkali metal thiosulphates, such as sodium thiosulphate, alkylamines and furthermore ammonium hydroxide and ammonium salts, such as ammonium polysulphides, can preferably be used.

Preferred possible metal salts in carrying out the second stage of process (3) according to the invention are all those metal salts which have already been mentioned as preferred in connection with the description of variant (e) of process (1) according to the invention. Iron-II acetate, iron-II sulphate, iron-III sulphate, copper acetate, zinc acetate, manganese-II acetate, cobalt chloride, zinc chloride and tin-II chloride may be mentioned in particular.

Process (3) according to the invention is carried out in an aqueous medium, preferably in water. However, it is also possible to replace some of the water by other diluents, such as hydrogen sulphide or alcohols, methanol and ethanol being mentioned in particular.

The reaction temperatures can be varied within a substantial range in the case of process (3) according to the invention. In general, the reaction is carried out at between 50° C. and 120° C., preferably between 60° C. and 110° C.

In general, the reaction in process (3) according to the invention is carried out under normal pressure. However, it is also possible to carry out the reaction under increased pressure. The latter is advisable, in particular, if ammonium hydroxide or volatile amines are employed as the bases.

In carrying out process (3) according to the invention, 0.5 to 4 mols of base or basic salt and optionally 1 to 2 mols of metal salt are preferably employed per 1 mol (relative to the molecular unit

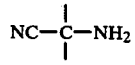

with the equivalent weight 54) of modified azulmic acid. The mixture is worked up by customary methods. In general, a procedure is followed in which, after the reaction has ended, the reaction mixture is filtered and the solid product obtained is appropriately washed and dried. However, a procedure is also possible in which the dispersion obtained after the reaction with bases or basic salts is first concentrated, an alcohol, such as methanol, is then added, the mixture is again concentrated under reduced pressure and, after repeating this operation several times, the solid product thereby obtained is filtered off, washed and appropriately dried.

In process (4) according to the invention, modified azulmic acids are treated with inorganic or organic acids. By modified azulmic acids there are to be understood here azulmic acids which contain structural defects and have been prepared by one of the above-mentioned processes. Preferred possible inorganic or organic acids are all those acids which have already been listed as preferred in connection with the description of the products according to the invention.

Process (4) according to the invention is carried out in an aqueous medium, preferably in water. However, it is also possible to replace some of the water by other diluents, such as alcohols, methanol and ethanol being mentioned in particular.

The reaction temperatures can be varied within a substantial range in the case of process (4) according to the invention. In general, the reaction is carried out at temperatures between 0° C. and 200° C., preferably between 20° C. and 120° C.

In general, the reaction in process (4) according to the invention is carried out under normal pressure. However, it is also possible to carry out the reaction under increased pressure.

In carrying out process (4) according to the invention, a catalytic amount, or even a larger amount—preferably 1 to 4 mols—of inorganic or organic acid is employed per 1 mol (relative to the molecular unit

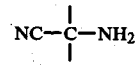

with the equivalent weight 54) of modified azulmic acid. The mixture is worked up by customary methods. In general, a procedure is followed in which, after the reaction has ended, the reaction mixture is filtered and the solid product obtained is appropriately washed and dried. Any excess acid still present in the products thus formed can be converted into the corresponding ammonium salt by gassing with ammonia, the reaction advantageously being carried out in the solid phase in a fluidized bed.

If free amino groups are still present in the products prepared by processes (1) to (4) according to the invention, these products can be converted into the corresponding acid addition salts by treatment with inorganic or organic acids. In this case, a procedure is followed in which the products are stirred with the particular acid in an aqueous medium, optionally at elevated temperature. The reaction products are isolated by filtration.

If free carboxyl groups are still present in the products prepared by processes (1) to (4) according to the invention, these products can be converted into the corresponding salts by treatment with bases. In this case, a procedure is followed in which the products are stirred with the particular base in an aqueous medium, optionally at elevated temperature. The reaction products are isolated by filtration.

As already mentioned, the products according to the invention can be used in very many ways. Thus, they are suitable, for example, as intermediate products for the preparation of stabilized azulmic acids, by which are to be understood azulmic acids with a high resistance towards resplitting into hydrocyanic acid. Stabilized azulmic acids of this type can be prepared by a process in which the modified azulmic acids according to the invention are reacted with carbonyl compounds, preferably aldehydes, in an aqueous medium at temperatures between 20° C. and 150° C., preferably between 50° C. and 120° C., aldehydes which may be mentioned in particular being formaldehyde, acetaldehyde, crotonaldehyde, isobutyraldehyde, glyoxal, acrolein, hydroxyacetaldehyde, hydroxypivalaldehyde, glyceraldehyde, furfuryl, chloral or chloral hydrate, hydroxymethylfurfurol, glucose, methylglyoxal and salicylaldehyde, and, as a reagent which splits off formaldehyde, hexamethylenetetramine, paraformaldehyde or trioxane. Isolation of the reaction products is carried out by filtration. No hydrogen cyanide is split off from stabilized azulmic acids of this type even on prolonged storage at room temperature, or even at higher temperatures. The substances concerned can be employed for the most diverse purposes. An example which may be mentioned is their use as fillers in polyurethanes or other plastics, and furthermore their use as catalysts or catalyst supports, flameproofing agents and agrochemicals.

The substances according to the invention can furthermore be employed as reactive fillers and as catalysts in isocyanate chemistry, for the preparation of polyurethane plastics. Those substances according to the invention which contain metal salts or metal ions are particularly suitable here.

Those substances according to the invention which have a high ionic constituent and thus have a polyelectrolyte character can be used as ion exchangers or also as catalysts. Potassium salts of azulmic acid may be mentioned as examples in this connection.

Numerous substances according to the invention can be used as flameproofing agents or anti-ageing agents in the most diverse polyurethane plastics, polyamide plastics, vinyl polymers, rubbers and epoxide resins. Those substances according to the invention which phosphoric acid, phosphorous acid, polymethyleneureas, polymethylenemelamines, calcium phosphates, aluminum phosphates, aluminum silicates, hydrated aluminum oxide, waterglass, melamine phosphate, barium phosphates, ammonium magnesium phosphates and urea oxalate are particularly suitable for this purpose.

Furthermore, the products according to the invention can either themselves be employed as agrochemicals or can be used as intermediate products for the preparation of agrochemicals. Those compounds which contain salts important for plant nutrition are particularly suitable for this purpose.

EXAMPLES

EXAMPLE 1

Comparison experiment: polymerization of monomeric hydrocyanic acid in the presence of potassium cyanate (compare Angew. Chem. 72, (1960) page 380, Example 4).

200 Parts by weight of a 30% strength aqueous hydrocyanic acid solution are warmed to 40° to 50° C. in the presence of 1.08 parts by weight of potassium cyanate for 5 hours. The product formed is filtered off, washed successively with distilled water and ethanol and then dried at 80° C. Azulmic acid is obtained in the form of a black powder in a yield of 95% of theory.

Elementary analysis: 41.4% C; 4.0% H; 43.2% N; 11.4% O

On the basis of the oxygen values given, this azulmic acid, the formula of which is approximately characterized by the formula (I) indicated on page 3 of this Application, has the empirical formula $C_{24}H_{28}O_5N_{22}$ (compare Angew. Chem. 72 (1960) page 383).

Small amounts of monomeric hydrocyanic acid are continuously split off from this polymer, even after careful drying for a long time at room temperature or at 80° C. Subsequent intensive washing and renewed drying, even under a high vacuum, does not stop the resplitting into hydrocyanic acid.

The determination of hydrogen cyanide is carried out by customary methods.

If 2,000 g of the azulmic acid which has been prepared by the method indicated above are stored at 50° C. in a container with a volume of air of 12 liters, after 2 hours a hydrogen cyanide concentration of 0.066 g of hydrogen cyanide per 12 liters of air is measured. A hydrogen cyanide MWC (MWC=maximum work place concentration) of 4,583 ppm is calculated from this, that is to say a MWC value which is 416 times greater than the legally imposed MWC value of 11 ppm. An azulmic acid of this type is accordingly completely unsuitable for use in practice.

If 10 parts by weight of the azulmic acid prepared by the process above are treated with 100 parts by weight of distilled water at 100° C. for 3 hours and the concentration of cyanide ions in the filtrate is then determined, a concentration of cyanide ions is found which corresponds to a hydrocyanic acid content of from 26 to over 28 mg per liter of water. Such concentrations of cyanide ions already cause destruction and deactivation of important bacteria, and their enzyme systems, occurring in soil.

EXAMPLE 2

Comparison experiment: polymerization of monomeric hydrocyanic acid by the "running in" process in the presence of ammonia (compare German patent specification No. 949,060).

A mixture of 5,600 g of water, 1,400 g of hydrocyanic acid and 88 g of ammonia is polymerized precisely according to the statements contained in Example 1 of German patent specification No. 949,060. After a polymerization time of about five hours at 50° C. and after discontinuing the cooling, the internal temperature rises to 90° C., remains at this level for about one hour and then falls. The azulmic acid formed is isolated, washed with water and dried at 80° C. Yield: 98% of theory.

Stability to heat:

Storage of 2,000 g of the azulmic acid at 50° C. for two hours (compare Example 1): MWC value over 5,000 ppm.

Stability to hydrolysis:

Treatment of 10 parts by weight of the azulmic acid with 100 parts by weight of distilled water at 100° C. for three hours (compare Example 1): hydrocyanic acid concentration of 30 to 36 mg per liter of water.

EXAMPLE 3

1,000 g of distilled water and 98 g (1 mol) of phosphoric acid are added to 108 g of an azulmic acid prepared according to Example 2 (disregarding the end groups, this amount corresponds on average to 2 base mols of polymerized aminocyanocarbon units having the structure

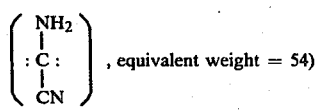
(equivalent weight = 54)

after prior drying of the acid, at 80° C. in a closed stirred apparatus and the mixture is heated to 100° C. The reaction mixture is kept at this temperature for 16 hours, and during this time, in which heterogeneous hydrolysis or partial decyclization takes place in the azulmic acid, a stream of nitrogen, serving as a propellant gas, is passed through the reaction mixture at a rate of about 50 ml per minute. The stream of nitrogen issuing from the mixture is passed through two wash bottles connected in series, the first being filled with 200 ml of 1 N aqueous hydrochloric acid in order to bond the ammonia contained in the stream of nitrogen and the second wash bottle being charged with 200 ml of 1 N aqueous sodium hydroxide solution in order to bond the carbon dioxide in the stream of nitrogen. The amounts of ammonia and carbon dioxide evolved from the azulmic acid are determined titrimetrically at intervals of 1 to 3 hours. After a reaction time of 16 hours, the total amount of ammonia which is formed by hydrolytic production of $F_1$ structural defects of the formula

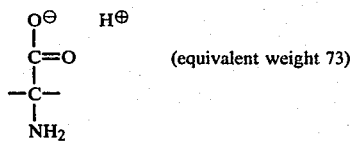
(equivalent weight 73)

is 6.4 g ($\approx$0.38 mol). The total amount of carbon dioxide which is formed by decarboxylation of $F_1$ structural defects to give $F_2$ structural defects of the formula

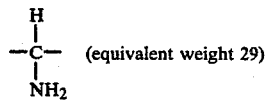
(equivalent weight 29)

is 4.3 g ($\approx$0.1 mol) (determined titrimetrically by the barium carbonate method). A round molar $NH_3/CO_2$ quotient of about 3.8 is calculated from these figures. This numerical value indicates that of about 4 carboxyl groups ($F_1$ structural defects) produced by decyclization and saponification of nitrile groups of the azulmic acid, about one is decarboxylated and thus leads to an $F_2$ structural defect.

The mixture is worked up by a procedure in which the solid reaction product is filtered off, washed and dried. 109 g of a (modified) azulmic acid containing $F_1$ structural defects and $F_2$ structural defects are obtained.

On the basis of this yield information and of the molar $NH_3/CO_2$ quotient determined of 3.8, and on the basis of the fact that the $F_2$ structural defects are formed from the $F_1$ structural defects (0.38 mol−0.1 mol=0.28 mol), it can be calculated that 100 parts by weight of the process product contain about 18.6 percent by weight of $F_1$ structural defects and about 2.67 percent by weight of $F_2$ structural defects. The sum $F_1$ structural defects and $F_2$ structural defects is 21.3 percent by weight.

As the elementary analysis shows, the modified azulmic acid contains about 9.3 percent by weight of phosphoric acid. This phosphoric acid is bonded to the polymer matrix via the free amino groups (anchor groups) of the modified azulmic acid.

EXAMPLE 4

1,000 g of distilled water and 0.5 mol of calcium sulphite dihydrate are added to 108 g (2 base mols) of an azulmic acid prepared according to Example 2, after prior drying of the acid, at 80° C. in a closed stirred apparatus and the mixture is heated to 100° C. The reaction mixture is kept at this temperature for 8 hours and, during this time, a stream of nitrogen is passed through at a rate of about 50 ml per minute. The content of ammonia and carbon dioxide in the stream of nitrogen issuing from the reaction mixture is determined in the manner indicated in Example 3. A modified azulmic acid is obtained, the molar $NH_3/CO_2$ quotient of which is 2.68.

EXAMPLE 5

1,000 g of deionized water are added to 108 g (2 base mols) of an azulmic acid prepared according to Example 2, after prior drying of the acid, at 80° C. in a closed stirred apparatus and the mixture is heated to 100° C. The reaction mixture, in which the pH value is 6.2, is kept at this temperature for 8 hours, and during this time a stream of nitrogen is passed through at a rate of 50 ml per minute. The content of ammonia and carbon dioxide in the stream of nitrogen issuing from the reaction mixture is determined in the manner indicated in Example 3. The total amount of ammonia evolved is 0.059 mol.

The total amount of carbon dioxide evolved is 0.023 mol.

This gives a molar $NH_3/CO_2$ quotient of 2.57.

By obtaining the difference between the amounts of ammonia and carbon dioxide evolved (0.059−0.023=0.036), it is calculated that about 0.036 equivalent of $F_1$ structural defects is formed and about 0.023 equivalent of $F_2$ structural defects is formed.

Yield of modified azulmic acid: 107 g

From this yield information, the molar $NH_3/CO_2$ quotient and the difference between the molar amounts of ammonia and carbon dioxide evolved (0.059−0.023=0.036), it is calculated that 100 parts by weight of the process product contain about 2.57 percent by weight of $F_1$ structural defects and about 0.7 percent by weight of $F_2$ structural defects.

EXAMPLE 6

350 g of approximately 25 percent strength by weight aqueous ammonia solution (=87.5 g (about 5.15 mols) of ammonia), which contain 70 g (1.1 mols) of sodium cyanate, are added to 7 liters of 20% strength aqueous hydrocyanic acid (=1,400 g (52 mols) of hydrogen cyanide), while stirring intensively. This mixture is warmed to 40° C. Thereafter, the temperature rises to 70° C. due to the heat of polymerization liberated. The mixture is heated to 90° C. for a further 4 hours and then worked up by a procedure in which the brown-black polymer obtained, which forms no colloidal solutions in water, is filtered off, washed successively with water and ethanol and then dried at 50°−80° C. under reduced pressure.

Yield: 94.9% of theory.

Elementary analysis: 40.6% C; 4.1% H; 42.4% N; 12.8% O.

The concentration of the carbonate constituent detected in the mother liquor of the polymerization mixture corresponds to an amount of carbon dioxide evolved of about 0.02 mol per 100 g of polymer. Accordingly, 0.56 percent by weight of $F_2$ structural defects has already been introduced into the product during the preparation of the polymer. Furthermore, on the basis of a molar $NH_3/CO_2$ quotient of about 4, such as has been found for hydrolysis of sodium cyanate-free azulmic acid at 90° C. for two hours in a parallel experiment, an amount of ammonia of 0.08 mol has been evolved per 100 g of the polymer prepared, which corresponds to a content of $F_1$ structural defects of 4 percent by weight.

Thus, the polymer prepared in the above process is an azulmic acid containing $F_1$ structural defects and $F_2$ structural defects, that is to say a modified azulmic acid.

EXAMPLE 7

4 liters of 20% strength aqueous hydrocyanic acid, 200 ml of approximately 25% strength aqueous ammonia solution and 40 g of sodium cyanate are stirred together. This reaction mixture is heated to 90° C. in the course of 2 hours. Thereafter, the mixture is stirred at 90° C. for a further 30 minutes, using a very effective reflux stirrer and utilizing the hydrocyanic acid reflux. 500 ml of water and a small amount of hydrocyanic acid are then distilled off and 500 ml of water are again added. The mixture is then stirred at 100° C. for 5 hours. The black process product thereby obtained, which can be filtered excellently, is filtered off, washed successively with about 4 liters of water and with methanol and dried under reduced pressure.

Yield: 845 g of azulmic acid containing $F_1$ structural defects and $F_2$ structural defects.

Content of structural defects: about 11 percent by weight.

Elementary analysis: 38.2% C; 4.9% H; 38.8% N; 18.9% O.

As can be seen from these values, the product has a higher oxygen content and a lower nitrogen content than the azulmic acid prepared according to Example 1. This indicates that the product according to the invention contains a large proportion of structural defects ($F_1$ and $F_2$).

EXAMPLE 8

When the hydrocyanic acid polymerization described above is carried out with the aid of aqueous ammonia solution and sodium cyanate, as the catalyst, at 40° C. under the conditions indicated in Example 1, an azulmic acid is obtained which is virtually free from structural defects and thus has a relatively low oxygen content.

Elementary analysis: 41.6% C; 3.9% H; 45.8% N; 7.5% O

EXAMPLE 9

A mixture of 108 g of the modified azulmic acid prepared according to Example 7 (content of structural defects about 11 percent by weight), 0.5 mol of imidazole and 800 ml of water is warmed to 100° C. for 20 hours. The mixture is then worked up by a procedure in which the solid product is filtered off, washed and dried. A modified azulmic acid is obtained which, on the basis of the balance determined for the splitting off of ammonia and carbon dioxide, contains about 30 percent by weight of $F_1$ structural defects.

EXAMPLE 10

A mixture of 200 g of the azulmic acid prepared according to Example 6, with a relatively low content of structural defects (composition: 40.6% C; 4.1% H; 42.4% N; 12.8% O) and 800 g of a 25% strength aqueous ammonia solution is stirred at 25°–31° C. for 8 hours. The black powder is then filtered off, washed with 5 liters of water and dried at room temperature in a vacuum drying cabinet.

Yield: 215 g of a modified azulmic acid which contains about 6–7 percent by weight of ammonia bonded to $F_1$ structural defects. The formula of modified $F_1$ structural defects of this type can be illustrated as follows:

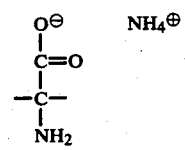

Elementary analysis: 37.6% C; 4.8% H; 38.5% N; 19.4% O.

If the process product is not dried at room temperature but at higher temperatures, ammonia is readily split off.

EXAMPLE 11

A mixture of 200 g of the azulmic acid prepared according to Example 6, with a relatively low content of structural defects, and 800 g of a 25% strength aqueous ammonia solution is stirred at 80° C. in a closed apparatus for 3 hours. The black powder is then filtered off, washed with 5 liters of water and dried at room temperature in a vacuum drying cabinet. A modified azulmic acid is obtained which contains about 13 percent by weight of ammonia bonded to $F_1$ structural defects.

EXAMPLE 12

A mixture of 108 g of the azulmic acid prepared according to Example 6, 14 g of calcium thiosulphate hexahydrate and 800 ml of water is warmed to 100° C. for 1.6 hours. The mixture is then worked up by a procedure in which the solid product is filtered off, washed and dried. A modified azulmic acid is obtained which, on the basis of the amounts of ammonia and carbon dioxide evolved, contains about 3.3 percent by weight of $F_1$ structural defects additionally formed and about 1.4 percent by weight of $F_2$ structural defects additionally formed.

EXAMPLE 13

A mixture of 108 g of the modified azulmic acid prepared according to Example 6, 19 g of calcium dihydrogen sulphide hexahydrate and 800 ml of water is warmed to 100° C. for 2 hours. The mixture is then worked up by a procedure in which the solid product is filtered off, washed and dried. A modified azulmic acid is obtained which contains about 2 percent by weight of calcium and, as is given by the amounts of ammonia and carbon dioxide evolved, has an approximate content of $F_1$ structural defects additionally formed of 7 percent by weight and of $F_2$ structural defects additionally formed of 0.9 percent by weight.

EXAMPLE 14

A mixture of 108 g of the modified azulmic acid prepared according to Example 6 and 1,000 ml of 1 N aqueous potassium hydroxide solution are warmed to 100° C. for 44 hours. The azulmic acid employed is thereby already completely dissolved a few minutes after the start of the reaction.

The progress of the saponification reaction is monitored by measuring the amounts of ammonia and carbon dioxide evolved. The amount of ammonia liberated is 12.2 g after 8 hours, 15 g after 22 hours and 17 g (=1 mol) after 44 hours.

In a parallel experiment carried out under exactly the same conditions, it is found, by acidifying the reaction mixture with 2 mols of aqueous hydrochloric acid, that about 21.9 g (=0.5 mol) of carbon dioxide were bonded in the solution as potassium carbonate.

The mixture is worked up by a procedure in which the brown-black aqueous reaction solution is concentrated under 14 mm Hg, methanol is added three times, in an amount of 1 liter each time, to the brown-black dispersion thereby formed and each time the mixture is concentrated by distilling off the methanol and the water still present, and the crystals which remain are then boiled up briefly once again with 800 ml of methanol and filtered off. 113 g of a water-soluble product with a humus-like color are obtained.

Elementary analysis: 31.5% C; 3.9% H; 26.8% N; 21.0% O; 16.1% K.

The amounts measured of ammonia and carbon dioxide liberated give a molar $NH_3/CO_2$ quotient of 2.

The difference between the numbers of mols of ammonia and carbon dioxide determined is about 0.5. This factor indicates that about half of all the $F_1$ structural defects have been converted into $F_2$ structural defects.

On the basis of these figures, it is calculated that 100 parts by weight of the process product contain about 55 percent by weight of potassium salt $F_1$ structural defects of the formula

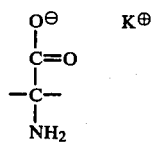

and about 14.5 percent by weight of $F_2$ structural defects. In this method for producing structural defects, in each case one potassium salt $F_1$ structural defect of the above formula is accordingly formed per 2 cyclic units of the azulmic acid. In the ideal case, a product of this type can be illustrated by the formula which follows:

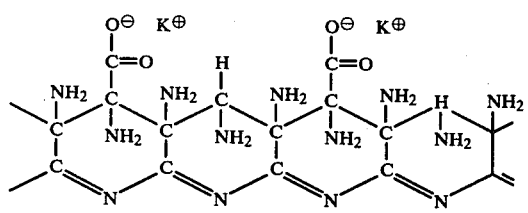

If both the polymolecularity of the process product and the fact that oxygen atoms in the form of carbonyl groups (which help to increase the oxygen content) are present in the "anionic" and "cationic" portion of end groups in the azulmic acid, the values found in the elementary analysis are in relatively good agreement with those for products which have average molecular weights of between 600 and 800. By way of comparison, the elementary composition which follows is calculated for a single compound or empirical formula $C_{21}H_{28}N_{17}O_9K_3$ (molecular weight=789): 32.4% C; 3.5% H; 30.5% N; 18.5% O; 15.1% K.

The process product, which can be described as a polyelectrolyte, contains a low-molecular fraction which is particularly readily soluble in water and, on the basis of its elementary composition, can be illustrated approximately by the formula which follows:

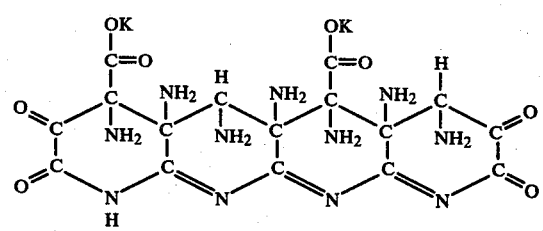

(molecular weight 569)

Elementary analysis of the low-molecular product 35.7% C; 2.5% H; 23.5% N; 23.7% O; 14.5% K.

The salts, listed in Table 1 which follows, of modified azulmic acids are also obtained by the method described in Example 14 by reacting azulmic acid prepared according to Example 6 with the corresponding bases or basic salts:

TABLE 1

| Example No. | Base or salt | Product | Color |
|---|---|---|---|
| 15 | $K_2CO_3$ | Azulmic acid potassium salt | humus-colored |
| 16 | $KHCO_3$ | Azulmic acid potassium salt | " |
| 17 | $Na_2S$ | Azulmic acid sodium salt | " |
| 18 | $K_2S$ | Azulmic acid potassium salt | " |
| 19 | $Na_2S_2O_3$ | Azulmic acid sodium salt | " |
| 20 | LiOH | Azulmic acid lithium salt | " |

The compounds listed in Table 2 which follows are obtained from the azulmic acid potassium salt, prepared according to Example 14, by reaction with metal halides, metal hydroxides, nitrates or metal sulphates in an aqueous solution.

TABLE 2

| Example No. | Metal salt or base | Product |
|---|---|---|
| 21 | $Ca(OH)_2$ | Azulmic acid calcium salt |
| 22 | $Ba(OH)_2$ | Azulmic acid barium salt |
| 23 | $PbCl_4$ | Azulmic acid lead salt |
| 24 | $MgCl_2$ | Azulmic acid magnesium salt |
| 25 | $SrCl_2$ | Azulmic acid strontium salt |
| 26 | $FeSO_4$ | Azulmic acid iron salt |
| 27 | $CoSO_4$ | Azulmic acid cobalt salt |
| 28 | $CuSO_4$ | Azulmic acid copper salt |
| 29 | $MnSO_4$ | Azulmic acid manganese salt |
| 30 | $NiCl_2$ | Azulmic acid nickel salt |
| 31 | $ZnSO_4$ | Azulmic acid zinc salt |
| 32 | $SnCl_4$ | Azulmic acid tin salt |
| 33 | $CdSO_4$ | Azulmic acid cadmium salt |
| 34 | $Bi_2(SO_4)_3$ | Azulmic acid bismuth salt |
| 35 | $Al_2(SO_4)_3$ | Azulmic acid aluminum salt |
| 36 | $AgNO_3$ | Azulmic acid silver salt |
| 37 | $HgCl_2$ | Azulmic acid mercury salt |
| 38 | $AuCl_3$ | Azulmic acid gold salt |

EXAMPLE 39

34 g of approximately 25% strength aqueous ammonia solution, which contains 6.8 g of sodium cyanate, are added to 600 ml of 18% strength aqueous hydrocyanic acid and 100 g of polymethyleneurea, while stirring intensively. After warming the mixture to 40° C., the temperature rises to 70° C. due to the heat of polymerization liberated. The mixture is heated to 90° C. for a further 4 hours and then worked up by a procedure in which the polymer is filtered off, washed successively with water and ethanol and then dried under reduced pressure. Yield: 201 g of modified azulmic acid which contains polymethyleneurea. Nitrogen content of the process product: 38.9%.

Modified azulmic acids containing the additives listed in Table 3 below are also prepared by the method described in Example 39. In each case, 1 liter of 19.2% strength aqueous hydrocyanic acid is polymerized in the presence of in each case 180 g of additive.

TABLE 3

| Example No. | Additive | Yield (in g) | Nitrogen content of the product |
|---|---|---|---|
| 40 | Active charcoal | 342 | 22.9% |
| 41 | Bleaching earth | 340 | 22.7% |
| 42 | Asbestos flour | 354 | 20.1% |
| 43 | Trilon B | 170 | 41.8% |
| 44 | Starch (insoluble) | 342 | 22.4% |
| 45 | Fly ash "M" | 353 | about 22% |
| 46 | Peat (moist) | 155 | 31.3% |

EXAMPLE 47

(a) A mixture of 108 g of azulmic acid which is almost free from structural defects, 100 g of the azulmic acid-cadmium chloride complex and 1,000 g of distilled water is stirred at 70° C. for 8 hours. The solid product is then filtered off, washed and dried. An azulmic acid-cadmium chloride complex with a relatively high content of $F_1$ structural defects and $F_2$ structural defects is obtained. The content of $F_1$ structural defects is about 10–12 percent by weight.

(b) The azulmic acid-cadmium chloride complex required as the starting material is prepared in the manner indicated below:

100 g of azulmic acid stabilized with formaldehyde and with a content of $F_1$ structural defects of about 2.6 percent by weight and a content of $F_2$ structural defects of 0.6 percent by weight are stirred with 0.5 mol of cadmium-II chloride and 600 ml of distilled water at room temperature for 6 hours. Thereafter, the solid product is filtered off, washed well with water and dried at 100° C. A black, finely powdered product with a cadmium content of 8.1 percent by weight is isolated. The process product is azulmic acid stabilized with formaldehyde, which contains cadmium-II chloride bonded as a complex. The azulmic acid complex salt is completely stable towards the splitting off of hydrogen cyanide.

(c) The azulmic acid stabilized with formaldehyde and required as a starting material is prepared in the manner indicated below:

108 g of the modified azulmic acid prepared according to Example 6 are stirred into 1,000 g (=10 mols) of 30% strength aqueous formalin solution and the mixture is kept at 100° C. for 8 hours. The mixture is then worked up by a procedure in which the reaction product is filtered off, washed with water and then freed from moisture and traces of formaldehyde with methanol. 150 g of stabilized azulmic acid are obtained, from which no hydrogen cyanide is split off even at 180° C. In the case of a sample stored at 60° C., a value for the splitting off of hydrogen cyanide of 0 ppm is measured.

The azulmic acid complexes, containing structural defects, listed in Table 4 below, are obtained in the manner indicated in Example 47 under (a) by reacting azulmic acid which is relatively free from structural defects with the corresponding azulmic acid-metal salt complex.

TABLE 4

| Example No. | Azulmic acid-metal salt complex | Content of $F_1$ structural defects [%] |
|---|---|---|
| 48 | Az—MnSO$_4$ complex | 9 |
| 49 | Az—Su—Cl$_2$ complex | 12 |
| 50 | Az—CuSO$_4$ complex | 8 |
| 51 | Az—HgCl$_2$ complex | 7 |
| 52 | Az—CoCl$_2$ complex | 10.5 |
| 53 | Az—ZnCl$_2$ complex | 13 |
| 54 | Az—FeSO$_4$ complex | 8 |
| 55 | Az—PbCl$_2$ complex | 9 |
| 56 | Az—Bi(NO$_3$)$_3$ complex | 8 |
| 57 | Az—AgNO$_3$ complex | 7 |

"Az" in each case represents "azulmic acid".

The preparation of those azulmic acid complex salts which are required as starting materials in the case of the reactions according to Examples 48 to 57 are obtained in the manner indicated in Example 47 under (b), by reacting in each case 100 g of azulmic acid stabilized with formaldehyde with in each case 0.5 mol of a salt of the appropriate metal. The individual azulmic acid complex salts are listed in Table 5 below.

TABLE 5

| Example No. | Metal Salt | Metal content of the azulmic acid complex |
|---|---|---|
| 48 b | MnSO$_4$ | 3.65% by weight |
| 49 b | SnCl$_2$ | 23.5% by weight |
| 50 b | CuSO$_4$ | 10.4% by weight |
| 51 b | HgCl$_2$ | 28.4% by weight |
| 52 b | CoCl$_2$ | 5.2% by weight |
| 53 b | ZnCl$_2$ | 10.4% by weight |
| 54 b | FeSO$_4$ | 6.8% by weight |
| 55 b | PbCl$_2$ | 25.8% by weight |
| 56 b | Bi(NO$_3$)$_3$ | 21% by weight |
| 57 b | AgNO$_3$ | 26.7% by weight |

EXAMPLE 58

A mixture of 100 g of azulmic acid which is almost free from structural defects, 17 g of copper nitrate trihydrate, 300 g of formic acid and 80 g of water is stirred at 60°–70° C. for 6 hours, while passing 25 liters of air through per hour. Thereafter, the solid product is filtered off, washed and dried. An azulmic acid-copper nitrate complex with a content of $F_1$ structural defects of about 8.9 percent by weight and a content of $F_2$ structural defects of about 2.3 percent by weight is obtained. 0.8 percent by weight of oxamide, which is formed, from monomeric hydrocyanic acid which has been split off, in the course of the oxidative production of structural defects and simultaneous complexing, is also isolated.

EXAMPLE 59

A mixture of 108 g of the azulmic acid prepared according to Example 6, 1 mol of iron-II sulphate and 800 ml of distilled water is stirred at 100° C. for 10 hours.

Thereafter, the solid product is filtered off, washed with 5% strength aqueous ammonia solution and dried. An azulmic acid is obtained which contains a relatively high proportion of structural defects (up to 20 percent by weight) and has the composition: 30.3% C; 3.6% H; 28.7% N; 26.8% O; 11.5% Fe.

The compounds listed in Table 6 below are prepared in an analogous manner.

TABLE 6

| Example No. | Metal compound used | Composition of the product | | |
|---|---|---|---|---|
| 60 | CuSO$_4$ | 24.5% C; | 2.2% H; | 22.6% N; |
| | | 23.8% O; | 3.3% S; | 23.9% Cu |
| 61 | FeCl$_3$ | 35.7% C; | 3.1% H; | 33.3% N |
| | | 22.3% O; | 1.7% Cl; | 4.4% Fe |
| 62 | ZnCl$_2$ | 23.5% C; | 2.2% H; | 21.6% N; |
| | | 19.1% O; | 34.1% Zn | |
| 63 | CoCl$_2$ | 28.4% C; | 2.7% H; | 27.8% N; |
| | | 20.4% O; | 20.2% Co | |
| 64 | Cu(OCOCH$_3$)$_2$ | 22.3% C; | 2.6% H; | 22.6% N; |
| | | 18.4% O; | 33.9% Cu | |
| 65 | SnCl$_2$ | 14.7% C; | 2.3% H; | 12.9% N; |
| | | 24.8% N; | 44.3% Sn | |
| 66 | MnSO$_4$ | 28.4% C; | 3.1% H; | 26.6% N; |
| | | 24.2% O; | 17.6% Mn | |
| 67 | SnCl$_2$ (0.4 mol) | 23.4% C; | 2.7% H; | 21.0% N; |
| | | 21.9% O; | 25.9% Sn | |
| 68 | ZnCl$_2$ (0.5 mol) | 29.2% C; | 2.6% H; | 5% N; |
| | | 19.1% O; | 19.8% Zn | |
| 69 | PbCl$_2$ | 58.3% Pb | | |
| 70 | Bi(NO$_3$)$_3$ | 59.1% Bi | | |
| 71 | Tl$_2$SO$_4$ | 57.9% Tl | | |
| 72 | TiCl$_4$ (xylene) | 25.2% Ti | | |
| 73 | Zr(SO$_4$)$_2$ | 38.9% Zr | | |
| 74 | H$_2$WO$_4$ | 55.8% W | | |
| 75 | NiCl$_2$ | 29.2% Ni | | |
| 76 | AgNO$_3$ | 43.1% Ag | | |
| 77 | HgCl$_2$ | 58.3% Hg | | |
| 78 | HAuCl$_4$ | 56% Au | | |
| 79 | H$_2$PaCl$_6$ | 55.5% Pa | | |

EXAMPLE 80

A mixture of 100 g of azulmic acid which is almost free from structural defects, 100 g of gelatin, 100 g of cellulose powder, 0.8 mol of phosphoric acid and 1,200 ml of water is stirred at 60° C. for 2 hours. Thereafter, the solid product is filtered off, washed and dried. A mixed product consisting of azulmic acid and of cellulose powder and gelatin and their degradation products, which contains a relatively high proportion of structural defects and contains phosphoric acid, is isolated.

EXAMPLE 81

(a) The following substances are stirred into 1,800 g of distilled water: 108 g of the modified azulmic acid prepared according to Example 6, 10 g of normal peat, 5 g of a commercially available limed peat, 5 g of potassium nitrate, 10 g of calcium cyanamide, 5 g of calcium nitrate, 20 g of a calcium sulphite waste liquor, which contains about 40% of lignin-sulphonates and lignin-carbohydrate compounds, 15 g of calcium dihydrogen phosphate, 5 g of peat which has been prepared by processing peat with waste products of animal and vegetable origin, 10 g of Leuna saltpeter (ammonium sulphate.2 ammonium nitrate), 5 g of calcium ammonium nitrate (ammonium nitrate + calcium carbonate), 5 g of a limed peat fertilizer which consists of carbonated lime, magnesium carbonate and about 20% by weight of peat, 5 g of a 10% strength solution, rendered alkaline with potassium hydroxide, of humic acids, 50 g of a sparingly soluble condensation product of 1 mol of urea and 1 mol of isobutyraldehyde, 30 g of a polymethyleneurea of the formula $$H_2N-C-NH-[CH_2-NH-C-NH-]_xH$$
$$\phantom{H_2N-C-NH-[CH_2-NH-}\|$$
$$\phantom{H_2N-C-NH-[CH_2-NH-}O$$

$$x = 4-12$$

and 0.5 g of iron-II sulphate, 0.2 g of copper sulphate, 0.2 g of manganese-II sulphate and 0.1 g of zinc sulphate. The well-stirred dispersion is heated to 80° C. and kept at this temperature for 4 hours.

(b) In a parallel experiment, 100 g of the modified azulmic acid prepared according to Example 6 are treated with the trace element salts listed, in the amounts indicated and under the conditions given under (a), but without further additives. From the ammonia/carbon dioxide balance thereby determined, it is found that about 0.2 mol of ammonia and about 0.05 mol of carbon dioxide are evolved. This gives a molar NH$_3$/CO$_2$ quotient of 4. The difference between the molar amounts of ammonia and carbon dioxide (0.1 − 0.05 = 0.15) shows that 0.15 equivalent of F$_1$ structural defects and about 0.05 equivalent of F$_2$ structural defects have been produced. About 10.2% by weight of F$_1$ structural defects and about 1.45% by weight of F$_2$ structural defects have accordingly been formed. Total content of structural defects (F$_1$+F$_2$): 11.65% by weight.

On the basis of the results of this comparison experiment, it can be assumed that an analogous concentration of structural defects is present in the process product prepared according to (a).

(c) After the production of structural defects which is described under (a), the well-stirred mixture is treated with 300 g of a 30% strength aqueous formalin solution at 30° C. for 3 hours. Thereafter, the water and unreacted formaldehyde are removed by concentrating the reaction mixture under 14 mm Hg until it has a slurry-like consistency. The slurry, which still contains water, is poured into a pan and dried at 60° C. in a vacuum drying cabinet. 333 g of a friable, black-brown substance are obtained which, in addition to the trace elements iron, copper, manganese and zinc, also contains potassium, nitrogen and phosphorus as well as about 15 percent by weight of water. The nutrient ions are present in the product in a form available to plants.

In the air space of vessels which are half-filled with the process products, a hydrogen cyanide concentration of 0 ppm is measured after heating to 50° C. for 50 hours.

What is claimed is:

1. Solid modified azulmic acids, containing from 0.5 to 55 percent by weight of ionic groups of the formula $$\begin{array}{c} O^\ominus \phantom{xx} R^\oplus \\ | \\ C=O \\ | \\ -C- \\ | \\ NH_2 \end{array}$$

wherein R represents hydrogen, ammonium, one equivalent of a protonated or quaternized organic nitrogen base or of a sulphonium cation or one equivalent of a metal cation, and containing from 0.5 to 15 percent by weight of groups formed by decarboxylation reactions, said groups formed by decarboxylation reactions being of the formula

2. An acid addition salt of the modified azulmic acid of claim 1 prepared by addition of a proton of an inorganic or organic acid onto an amino group or other suitable group in said modified azulmic acid.

3. An azulmic acid complex compound of solid modified azulmic acids, containing from 0.5 to 55 percent by weight of ionic groups of the formula

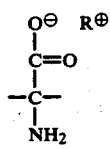

wherein R represents hydrogen, ammonium, one equivalent of a protonated or quaternized organic nitrogen base or of a sulphonium cation or one equivalent of a metal cation, and containing from 0.5 to 15 percent by weight of groups formed by decarboxylation reactions, said groups formed by decarboxylation reactions being of the formula

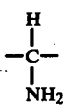

and a metal compound or an ammonium salt.

4. A mixture comprising solid modified azulmic acids, containing from 0.5 to 55 percent by weight of ionic groups of the formula

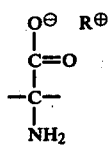

wherein R represents hydrogen, ammonium, one equivalent of a protonated or quaternized organic nitrogen base or of a sulphonium cation or one equivalent of a metal cation, and containing from 0.5 to 15 percent by weight of groups formed by decarboxylation reactions, said groups formed by decarboxylation reactions being of the formula

and a material selected from the group consisting of wood flour; lignin powder; lignin-sulphonic acids; ammonified lignin-sulphonic acids; humus, humic acids; ammonified humic acids; peat; proteins and their degradation products; algal material; polypeptides; fish-meal; bone-meal; aminoacids; oligopolypeptides; pectins; monosaccharides; disaccharides; aligosaccharides; polysaccharides; hemicelluloses; charcoals and ashes which are obtainable by oxidation of organic substances formed by photosynthesis or of customary fuels; metallic silicates; silicon dioxides; silicic acids and salts thereof; silica gels; clay minerals; mica; metallic and ammonium carbonates; phosphorite; metallic and ammonium phosphates; metallic and ammonium sulphates; metallic oxides; aminoplast condensates; polymeric quinones; addition products and condensation products of quinones with amines, ammonia, and aldehydes; crosslinked gelatin; urea/formaldehyde resin flakes; formose sugar mixtures prepared from formaldehyde; sparingly soluble cane sugar complexes; hexamethylene-tetramine; hexahydrotriazines; superphosphate; basic slag; Rhenania phosphate; calcium cyanamide; calcium ammonium nitrate; Leuna saltpeter; potassium nitrate; ammonium nitrate; metal hydroxides; and cobalt molybdate; and mixtures thereof.

5. A process for the preparation of solid modified azulmic acids containing from 0.5 to 55 percent by weight of ionic groups of the formula

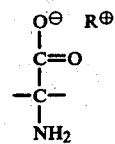

wherein R represents hydrogen, ammonium, one equivalent of a protonated or quaternized organic nitrogen base or of a sulphonium cation, and containing from 0.5 to 15 percent by weight of groups formed by decarboxylation reactions, said groups formed by decarboxylation reactions being of the formula

comprising treating in an aqueous medium with an organic or inorganic acid an azulmic acid prepared by aqueous polymerization of hydrocyanic acid, wherein the treatment is conducted between 0° C. to 200° C. and from 1 to 4 mols of organic or inorganic acid are used per mol of azulmic acid prepared by aqueous polymerization of hydrocyanic acid.

6. The process of claim 5, wherein the treating is conducted in the presence of a material selected from the group consisting of wood flour; lignin powder; lignin-sulphonic acids; ammonified lignin-sulphonic acids; humus, humic acids; ammonified humic acids; peat; proteins and their degradation products; algal material; polypeptides; fish-meal; bone-meal; aminoacids; oligopolypeptides; pectins; monosaccharides; disaccharides; aligosaccharides; polysaccharides; hemicelluloses; charcoals and ashes which are obtainable by oxidation of organic substances formed by photosynthesis or of customary fuels; metallic silicates; silicon dioxides; silicic acids and salts thereof; silica gels; clay minerals; mica; metallic and ammonium carbonates; phosphorite; metallic and ammonium phosphates; metallic and ammonium sulphates; metallic oxides; aminoplast condensates; polymeric quinones; addition products and condensation products of quinones with amines, ammonia, and aldehydes; crosslinked gelatin; urea/formaldehyde resin flakes; formose sugar mixtures prepared from formaldehyde; sparingly soluble cane sugar complexes; hexamethylene-tetramine; hexahydrotriazines; superphosphate; basic slag; Rhenania phosphate; calcium cyanamide; calcium ammonium nitrate; Leuna saltpeter; potassium nitrate; ammonium nitrate; metal hydroxides; and cobalt molybdate; and mixtures thereof.

7. The process of claim 5, further comprising treating the resultant product with an acid or base.

8. A process for the preparation of solid modified azulmic acids containing from 0.5 to 55 percent by weight of ionic groups of the formula

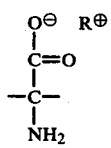

wherein R represents hydrogen, ammonium, one equivalent of a protonated or quaternized organic nitrogen base or of a sulphonium cation, and containing from 0.5 to 15 percent by weight of groups formed by decarboxylation reactions, said groups formed by decarboxylation reactions being of the formula

comprising treating in an aqueous medium, with bases or basic salts an azulmic acid prepared by aqueous polymerization of hydrocyanic acid wherein the treatment is conducted between 0° and 200° C. and from 1 to 4 mols of base or basic salt are used per mol of azulmic acid prepared by aqueous polymerization of hydrocyanic acid.

9. The process of claim 8, wherein the treating is conducted in the presence of a material selected from the group consisting of wood flour; lignin powder; lignin-sulphonic acids; ammonified lignin-sulphonic acids; humus; humic acids; ammonified humic acids; peat; proteins and their degradation products; algal material; polypeptides; fish-meal; bone-meal; aminoacids; oligopolypeptides; pectins; monosaccharides; disaccharides; aligosaccharides; polysaccharides; hemicelluloses; charcoals and ashes which are obtainable by oxidation of organic substances formed by photosynthesis or of customary fuels; metallic silicates; silicon dioxides; silicic acids and salts thereof; silica gels; clay minerals; mica; metallic and ammonium carbonates; phosphorite; metallic and ammonium phosphates; metallic and ammonium sulphates; metallic oxides; aminoplast condensates; polymeric quinones; addition products and condensation products of quinones with amines, ammonia, and aldehydes; crosslinked gelatin; urea/formaldehyde resin flakes; formose sugar mixtures prepared from formaldehyde; sparingly soluble cane sugar complexes; hexamethylene-tetramine; hexahydrotriazines; superphosphate; basic slag; Rhenania phosphate; calcium cyanamide; calcium ammonium nitrate; Leuna saltpeter; potassium nitrate; ammonium nitrate; metal hydroxides; and cobalt molybdate; and mixtures thereof.

10. The process of claim 8, further comprising treating the resultant product with an acid or base.

11. A process for the preparation of solid modified azulmic acids containing from 0.5 to 55 percent by weight of ionic groups of the formula

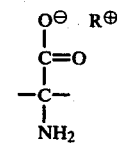

wherein R represents hydrogen, ammonium, one equivalent of a protonated or quaternized organic nitrogen base or of a sulphonium cation, and containing from 0.5 to 15 percent by weight of groups formed by decarboxylation reactions, said groups formed by decarboxylation reactions being of the formula

comprising treating with water for 4 to 60 hours at a pH of from 6 to 6.5 and at a temperature of from 60° to 150° C. an azulmic acid prepared by aqueous polymerization of hydrocyanic acid.

12. The process of claim 11, further comprising treating the resultant product with an acid or base.

13. A process for the preparation of solid modified azulmic acids containing from 0.5 to 55 percent by weight of ionic groups of the formula

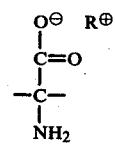

wherein R represents hydrogen, ammonium, one equivalent of a protonated or quaternized organic nitrogen base or of a sulphonium cation, and containing from 0.5 to 15 percent by weight of groups formed by decarboxylation reactions, said groups formed by decarboxylation reactions being of the formula

comprising treating azulmic acid in an aqueous medium, with the ashes produced by the combustion of fir, broom, Serbian spruce, oak, straw, birch, beech, willow, tobacco leaves, tobacco stalks, cereals, fungi, apples, carrots, potato tubers and the leaves of white cabbage, an azulmic acid prepared by aqueous polymerization of hydrocyanic acid, wherein the treatment is conducted at a temperature of from 50° to 150° C.

14. The process of claim 13, further comprising treating the resultant product with an acid or base.

15. A process for the preparation of solid modified azulmic acids containing from 0.5 to 55 percent by weight of ionic groups of the formula

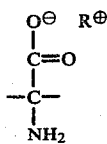

wherein R represents hydrogen, ammonium, one equivalent of a protonated or quaternized organic nitrogen base or of a sulphonium cation, and containing from 0.5 to 15 percent by weight of groups formed by decarboxylation reactions, said groups formed by decarboxylation reactions being of the formula

comprising treating in an aqueous medium with a metal salt an azulmic acid prepared by aqueous polymerization of hydrocyanic acid wherein the treatment is conducted at a temperature of from 0° to 150° C., and from 1 to 2 mols of metal salt are used per mol of azulmic acid prepared by aqueous polymerization of hydrocyanic acid.

16. The process of claim 15, wherein the treatment is conducted in the presence of oxidizing agents, organic acids, or mixtures thereof.

17. The process of claim 15, further comprising treating the resultant product with an acid or base.

18. A process for the preparation of solid modified azulmic acids containing from 0.5 to 55 percent by weight of ionic groups of the formula

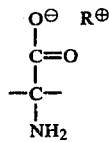

wherein R represents hydrogen, ammonium, one equivalent of a protonated or quaternized organic nitrogen base or of a sulphonium cation, and containing from 0.5 to 15 percent by weight of groups formed by decarboxylation reactions, said groups formed by decarboxylation reactions being of the formula

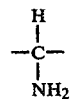

comprising treating in an aqueous medium with a metal salt complex of a stabilized azulmic acid, an azulmic acid prepared by aqueous polymerization of hydrocyanic acid, wherein the treatment is conducted at a temperature of from 0° to 150° C. and from 0.5 to 1 mol of complex is used per mol of azulmic acid prepared by aqueous polymerization of hydrocyanic acid.

19. The process of claim 18, further comprising treating the resultant product with an acid or base.

20. A process for the preparation of solid modified azulmic acids containing from 0.5 to 55 percent by weight of ionic groups of the formula

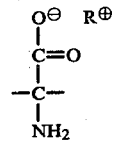

wherein R represents hydrogen, ammonium, one equivalent of a protonated or quaternized organic nitrogen base or of a sulphonium cation, and containing from 0.5 to 15 percent by weight of groups formed by decarboxylation reactions, said groups formed by decarboxylation reactions being of the formula

comprising polymerizing hydrocyanic acid under hydrolyzing conditions in an aqueous medium in the presence of basic catalysts wherein the polymerization is conducted between 40° and 60° C. up to a conversion of about 60% of the acid, then at between 80° to 90° C. to a conversion of about 90 to 95% of the acid and then at 100° C. for several hours until completion of the reaction.

21. The process of claim 20, wherein the polymerization is conducted in the presence of a material selected from the group consisting of wood flour; lignin powder; lignin-sulphonic acids; ammonified lignin-sulphonic acids; humus, humic acids; ammonified humic acids; peat; proteins and their degradation products; algal material; polypeptides; fish-meal; bone-meal; aminoacids; oligopolypeptides; pectins; monosaccharides; disaccharides; aligosaccharides; polysaccharides; hemicelluloses; charcoals and ashes which are obtainable by oxidation of organic substances formed by photosynthesis or of customary fuels; metallic silicates; silicon dioxides; silicic acids and salts thereof; silica gels; clay minerals; mica; metallic and ammonium carbonates; phosphorite; metallic and ammonium phosphates; metallic and ammonium sulphates; metallic oxides; aminoplast condensates; polymeric quinones; addition products and condensation products of quinones with amines, ammonia, and aldehydes; crosslinked gelatin; urea/formaldehyde resin flakes; formose sugar mixtures prepared from formaldehyde; sparingly soluble cane sugar complexes; hexamethylene-tetramine; hexahydrotriazines; superphosphate; basic slag; Rhenania phosphate; calcium cyanamide; calcium ammonium nitrate; Leuna saltpeter; potassium nitrate; ammonium nitrate; metal hydroxides; and cobalt molybdate; and mixtures thereof.

22. The process of claim 20, further comprising treating the resultant product with an acid or base.

23. A process for the preparation of solid modified azulmic acids containing from 0.5 to 55 percent by weight of ionic groups of the formula

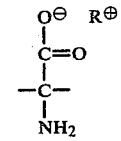

wherein R represents hydrogen, ammonium, one equivalent of a protonated or quaternized organic nitrogen base or of a sulphonium cation or one equivalent of a metal cation, and containing from 0.5 to 15 percent by weight of groups formed by decarboxylation reactions, said groups formed by decarboxylation reactions being of the formula

comprising reacting said modified azulmic acids with a base in an aqueous medium.

24. The process of claim 23, further comprising replacing the resultant cation by treatment with metal salts.

25. The process of claim 23, further comprising treating the resultant product with an acid or base.

26. A process for the preparation of modified azulmic acids containing from 0.5 to 55 percent by weight of ionic groups of the formula

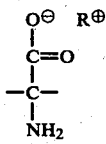

wherein R represents hydrogen, ammonium, one equivalent of a protonated or quaternized organic nitrogen base or of a sulphonium cation or one equivalent of a metal cation, and containing from 0.5 to 15 percent by weight of groups formed by decarboxylation reactions, said groups formed by decarboxylation reactions being of the formula

comprising reacting said modified azulmic acids with an organic or inorganic acid in an aqueous medium.

27. The process of claim 26, further comprising treating the resultant product with a base.

28. In the preparation of an isocyanate-polyaddition product by reacting an organic isocyanate with an active hydrogen containing material, the improvement wherein modified azulmic acids, containing from 0.5 to 55 percent by weight of ionic groups of the formula

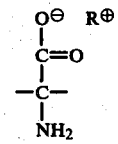

wherein R represents hydrogen, ammonium, one equivalent of a protonated or quaternized organic nitrogen base or of a sulphonium cation or one equivalent of a metal cation, and containing from 0.5 to 15 percent by weight of groups formed by decarboxylation reactions, said groups formed by decarboxylation reactions being of the formula

are included in the reaction mixture.

* * * * *